United States Patent
Okazaki et al.

(10) Patent No.: US 7,032,374 B2
(45) Date of Patent: Apr. 25, 2006

(54) EXHAUST PURIFICATION APPARATUS FOR INTERNAL COMBUSTION ENGINE

(75) Inventors: Shuntaro Okazaki, Susono (JP); Noriyasu Adachi, Numazu (JP); Naoto Kato, Susono (JP); Toshinari Nagai, Sunto-gun (JP); Yasuhiro Oi, Numazu (JP); Daisuke Kobayashi, Toyota (JP); Akira Ohata, Mishima (JP); Koji Ide, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 37 days.

(21) Appl. No.: 10/768,141

(22) Filed: Feb. 2, 2004

(65) Prior Publication Data

US 2004/0216450 A1    Nov. 4, 2004

(30) Foreign Application Priority Data

Feb. 3, 2003  (JP) ............................. 2003-026338
Jan. 21, 2004  (JP) ............................. 2004-013225

(51) Int. Cl.
 *F01N 3/00* (2006.01)

(52) U.S. Cl. ..................... 60/285; 60/274; 60/276; 701/103; 701/109

(58) Field of Classification Search ........... 60/274, 60/276, 277, 285; 701/103, 109
See application file for complete search history.

(56) References Cited

U.S. PATENT DOCUMENTS

| | | | |
|---|---|---|---|
| 5,099,647 A | 3/1992 | Hamburg | |
| 5,341,641 A * | 8/1994 | Nakajima et al. | 60/274 |
| 5,359,852 A * | 11/1994 | Curran et al. | 60/274 |
| 5,475,975 A | 12/1995 | Nasu | |
| 5,568,725 A * | 10/1996 | Uchikawa | 60/274 |
| 5,983,629 A * | 11/1999 | Sawada | 60/276 |
| 6,112,517 A * | 9/2000 | Yasui et al. | 60/274 |
| 6,253,542 B1 * | 7/2001 | Omara et al. | 60/274 |
| 6,453,665 B1 * | 9/2002 | Bower et al. | 60/285 |

FOREIGN PATENT DOCUMENTS

| | | |
|---|---|---|
| JP | A 7-197837 | 8/1995 |
| JP | A 11-159376 | 6/1999 |
| JP | 2000-508036 | 6/2000 |

\* cited by examiner

*Primary Examiner*—Binh Q. Tran
(74) *Attorney, Agent, or Firm*—Oliff & Berridge, PLC

(57) ABSTRACT

An exhaust purification apparatus for an internal combustion engine includes a catalyst unit disposed in an exhaust passage of the engine, upstream and downstream air-fuel-ratio sensors disposed upstream and downstream, respectively, of the catalyst unit, a main-feedback controller, and a sub-feedback controller. The main-feedback controller calculates a main-feedback control quantity on the basis of an output value of the upstream air-fuel-ratio sensor and a predetermined upstream-side target value, and corrects, on the basis of the main-feedback control quantity, the quantity of fuel injected by an fuel injector. The sub-feedback controller calculates a sub-feedback control quantity on the basis of an output value of the downstream air-fuel-ratio sensor and a predetermined downstream-side target value, and corrects, on the basis of the sub-feedback control quantity, the quantity of fuel injected by the fuel injector, independently of the correction of the fuel injection quantity by the main-feedback control means.

16 Claims, 15 Drawing Sheets

EXHAUST PURIFICATION APPARATUS FOR INTERNAL COMBUSTION ENGINE

BACKGROUND OF THE INVENTION

1. Field of the Invention

The present invention relates to an exhaust purification apparatus for an internal combustion engine, which apparatus includes air-fuel-ratio sensors disposed in an exhaust passage of the engine to be located upstream and downstream, respectively, of a catalyst unit disposed in the exhaust passage, and feedback-controls the air-fuel ratio of the engine on the basis of respective outputs of the sensors.

2. Description of the Related Art

For example, Japanese Patent Application Laid-Open (kokai) No. 7-197837 discloses a conventional exhaust purification apparatus of such a type. The disclosed exhaust purification apparatus for an internal combustion engine includes an upstream air-fuel-ratio sensor and a downstream air-fuel-ratio sensor, which are disposed upstream and downstream, respectively, of a catalyst unit disposed in an exhaust passage of the engine. A sub-feedback control quantity is calculated on the basis of (through proportional plus integral plus derivative processing (PID processing) of a deviation, from a predetermined downstream-side target value, of the output value of the downstream air-fuel-ratio sensor. Meanwhile, a main-feedback control quantity is calculated on the basis of (through proportional plus integral processing (PI processing) on a deviation, from a predetermined upstream-side target value, of the output value of the upstream air-fuel-ratio sensor having been corrected by use of the sub-feedback control quantity. The air-fuel ratio of the engine is feedback-controlled through correction of fuel injection quantity on the basis of the main-feedback control quantity.

The disclosed apparatus is configured in such a manner that the above-described deviation used to calculate the main-feedback control quantity is directly changed in accordance with the value of the sub-feedback control quantity. In other words, a main-feedback controller, which performs main-feedback control (calculates the main-feedback control quantity), and a sub-feedback controller, which performs sub-feedback control (calculates the sub-feedback control quantity), are arranged in series.

Accordingly, when one of a main-feedback control constant (proportional gain or integral gain) used by the main-feedback controller and a sub-feedback control constant (proportional gain, integral gain, or derivative gain) used by the sub-feedback controller is adjusted for optimization, the value of the other constant greatly affects the adjustment. In other words, adjustment of the feedback control constants of the main-feedback control loop (closed loop) and adjustment of the feedback control constants of the sub-feedback control loop (closed loop) cannot be performed independently of each other. Accordingly, adjustment of the feedback control constants has conventionally been difficult and required much labor.

SUMMARY OF THE INVENTION

In view of the foregoing, an object of the present invention is to provide an exhaust purification apparatus for an internal combustion engine, which apparatus includes an upstream air-fuel-ratio sensor and a downstream air-fuel-ratio sensor disposed upstream and downstream, respectively, of a catalyst unit disposed in an exhaust passage of the engine, and feedback-controls the air-fuel ratio of the engine on the basis of respective outputs of the air-fuel-ratio sensors, and which apparatus facilitates adjustment of respective feedback control constants.

In order to achieve the above object, the present invention provides an exhaust purification apparatus for an internal combustion engine equipped with fuel injection means for injecting fuel in a quantity changed in accordance with operating condition of the engine, comprising: a catalyst unit disposed in an exhaust passage of the engine; an upstream air-fuel-ratio sensor disposed in the exhaust passage to be located upstream of the catalyst unit; a downstream air-fuel-ratio sensor disposed in the exhaust passage to be located downstream of the catalyst unit; main-feedback control means for calculating a main-feedback control quantity on the basis of an output value of the upstream air-fuel-ratio sensor and a predetermined upstream-side target value, and correcting, on the basis of the main-feedback control quantity, the quantity of fuel injected by the fuel injection means, to thereby feedback-control the air-fuel ratio of the engine; and sub-feedback control means for calculating a sub-feedback control quantity on the basis of an output value of the downstream air-fuel-ratio sensor and a predetermined downstream-side target value, and correcting, on the basis of the sub-feedback control quantity, the quantity of fuel injected by the fuel injection means, independently of the correction of the fuel injection quantity by the main-feedback control means, to thereby feedback-control the air-fuel ratio of the engine.

The predetermined upstream-side target value and the predetermined downstream-side target value are preferably set to values corresponding to the stoichiometric air-fuel ratio. Further, these target values are preferably set in such a manner that air-fuel ratios corresponding to these values become equal to each other. Moreover, the main-feedback control means is preferably configured to calculate the main-feedback control quantity on the basis of a value determined on the basis of a deviation of the output value of the upstream air-fuel-ratio sensor from the predetermined upstream-side target value. Similarly, the sub-feedback control means is preferably configured to calculate the sub-feedback control quantity on the basis of a value determined on the basis of a deviation of the output value of the downstream air-fuel-ratio sensor from the predetermined downstream-side target value.

Examples of a "value determined on the basis of a deviation of the output value of a sensor from a target value" include, but are not limited thereto, a deviation of the output value of the sensor from the target value, a deviation of a detection air-fuel ratio (actual air-fuel ratio) corresponding to the output value of the sensor from a target air-fuel ratio corresponding to the target value, and a deviation of an actual cylinder fuel supply quantity (a value obtained by dividing a cylinder intake-air quantity by the detection air-fuel ratio corresponding to the output value of the sensor) from a target cylinder fuel supply quantity (a value obtained by dividing that cylinder intake-air quantity by the target air-fuel ratio corresponding to the target value).

By virtue of the above-described configuration, a (base) fuel injection quantity, which is determined on the basis of the operating conditions of the engine (e.g., rotation speed of the engine and opening of the throttle valve), is corrected on the basis of a correction amount determined from the main-feedback control quantity and a correction amount determined from the sub-feedback control quantity so as to determine a (final) fuel injection quantity; and fuel in the thus-determined quantity is injected by means of the fuel injection means, whereby the air-fuel ratio of the engine is controlled by means of the main-feedback control and the sub-feedback control.

In the exhaust purification apparatus of the present invention, the sub-feedback control means directly corrects the fuel injection quantity on the basis of the sub-feedback control quantity, in the same manner as does the main-feedback control means, but the correction is independent of the correction of the fuel injection quantity by the main-feedback control means. In other words, a main-feedback controller which performs the main-feedback control (calculates the main-feedback control quantity) and a sub-feedback controller which performs the sub-feedback control (calculates the sub-feedback control quantity) are disposed in parallel to the engine. Accordingly, the value of the sub-feedback control quantity and the value of the main-feedback control quantity do not directly influence each other, as occurs in the above-described conventional apparatus.

As a result, even when one of a main-feedback control constant (e.g., proportional gain or integral gain) used by the main-feedback controller and a sub-feedback control constant (e.g., proportional gain, integral gain, or derivative gain) used by the sub-feedback controller is adjusted for optimization, this adjustment of the control constant is less likely to be influenced by the other control constant. As a result, the labor needed to optimize the respective feedback control constants can be reduced.

Incidentally, as described above, in the disclosed conventional apparatus, since the main-feedback controller and the sub-feedback controller are disposed in series, so-called double-integral processing is performed by means of integral processing of PID (proportional plus integral plus derivative) processing performed in the sub-feedback control and integral processing of PI (proportional plus integral) processing performed in the main-feedback control. Accordingly, the conventional apparatus has a problem in that delay of feedback control easily becomes excessive, resulting in low control stability.

In contrast, in the exhaust purification apparatus of the present invention, the main-feedback controller and the sub-feedback controller are disposed in parallel to the engine. Accordingly, even when both the sub-feedback control (sub-feedback controller) and the main-feedback control (main-feedback controller) perform integral processing (I processing), the above-mentioned double-integral processing is not performed, and thus, the stability of control can be maintained at a high level.

Incidentally, a catalyst unit (catalytic converter) generally has a so-called oxygen storing function for reducing nitrogen oxide ($NO_x$) contained in exhaust gas flowing into the unit when the air-fuel ratio of the exhaust gas is a lean-side air-fuel ratio and storing oxygen captured from the nitrogen oxide, and oxidizing, by use of the stored oxygen, unburned components such as HC and CO contained in the exhaust gas when the air-fuel ratio of the exhaust gas is a rich-side air-fuel ratio. Therefore, among variations in the air-fuel ratio of exhaust gas on the upstream side of the catalyst unit, a high frequency component(s) having a relatively high frequency and a low frequency component(s) having a relatively low frequency and a relatively small amplitude (deviation from the stoichiometric air-fuel ratio) are completely absorbed by the oxygen storing function of the catalyst unit, and do not appear as variations in the air-fuel ratio of exhaust gas on the downstream side of the catalyst unit.

Meanwhile, among variations in the air-fuel ratio of exhaust gas on the upstream side of the catalyst unit, a low frequency component(s) having a relatively low frequency and a relatively large amplitude is not completely absorbed by the oxygen storing function of the catalyst unit, and appears, with slight delay, as a variation in the air-fuel ratio of exhaust gas on the downstream side of the catalyst unit. As a result, in some cases, the output value of the upstream air-fuel-ratio sensor and the output value of the downstream air-fuel-ratio sensor indicate air-fuel ratios having deviated from the stoichiometric air-fuel ratio in opposite directions. In such a case, air-fuel ratio control of the engine on the basis of the main-feedback control (i.e., on the basis of the main-feedback control quantity) and air-fuel ratio control of the engine on the basis of the sub-feedback control (i.e., on the basis of the sub-feedback control quantity) interfere with each other, so that the air-fuel ratio control of the engine cannot be performed properly.

In view of the foregoing, among respective frequency components of variation in the output value of the upstream air-fuel-ratio sensor, low frequency components whose frequencies are not higher than a predetermined frequency and which may appear as variations in the air-fuel ratio on the downstream side of the catalyst unit are cut before the output value of the upstream air-fuel-ratio sensor is used for the main feedback control. This low frequency component removing operation enables avoidance of generation of interference between air-fuel ratio controls of the engine.

On the basis of such knowledge, in the exhaust purification apparatus of the present invention, the main-feedback control means is preferably configured to calculate the main-feedback control quantity on the basis of a value obtained through performance of high-pass filter processing (processing for substantially prohibiting passage of low-frequency components whose frequencies are not higher than the predetermined frequency (in other words, processing which functions as a high-pass filter whose cutoff frequency is equal to the predetermined frequency)) on the value determined on the basis of the deviation of the output value of the upstream air-fuel-ratio sensor from the predetermined upstream-side target value.

By virtue of the above-described configuration, the above-described generation of interference between the air-fuel ratio controls of the engine can be avoided. In addition, the sub-feedback control means reliably performs air-fuel ratio control (substantial air-fuel ratio control) for variations in air-fuel ratio whose frequencies are not higher than the predetermined frequency and which may appear as variations in the air-fuel ratio on the downstream side of the catalyst unit. Moreover, since a high-frequency component (s) having a frequency higher than the predetermined frequency and contained in variation in the output value of the upstream air-fuel-ratio sensor passes through the high-pass filter, the high-frequency component(s) appears as a value after having undergone the above-descried high-pass filter processing. Accordingly, for example, in the case where the engine is in a transitional operating state, and the air-fuel ratio of exhaust gas changes drastically at a high frequency higher than the predetermined frequency, the main-feedback control can quickly and reliably perform the air-fuel ratio control for variations in air-fuel ratio whose frequencies are higher than the predetermined frequency (compensation for abrupt change in the air-fuel ratio in a transitional operating state).

In this case, the main-feedback control means may be configured to calculate the main-feedback control quantity on the basis of a value obtained through performance of high-pass filter processing on the output value of the upstream air-fuel-ratio sensor. Even when the processing for calculating the deviation of the output value of the upstream air-fuel-ratio sensor from the predetermined upstream-side target value is omitted and the output value of the upstream air-fuel-ratio sensor itself is directly used for the main-feedback control after being subjected to high-pass-filter processing, the same action and effects as described above can be achieved.

Moreover, in the exhaust purification apparatus of the present invention, when the value having been subjected to high-pass-filter processing is used for the main-feedback control as described above, the sub-feedback control means is preferably configured to calculate the sub-feedback control quantity on the basis of a value obtained through performance of low-pass filter processing (processing for substantially prohibiting passage of high-frequency components whose frequencies are higher than the predetermined frequency (in other words, processing which functions as a high-pass filter whose cutoff frequency is equal to the predetermined frequency)) on a value determined on the basis of the deviation of the output value of the downstream air-fuel-ratio sensor from the predetermined downstream-side target value, or on the basis of a value determined on the basis of the deviation, from the predetermined downstream-side target value, of a value obtained through performance of low-pass filter processing on the output value of the downstream air-fuel-ratio sensor.

By virtue of the above-described configuration, even when a high-frequency component (such as noise) whose frequency is higher than the predetermined frequency appears as a variation in the output value of the downstream air-fuel-ratio sensor, the output value of the downstream air-fuel-ratio sensor from which such a high-frequency component has been removed is used for the sub-feedback control. Accordingly, the above-described substantial air-fuel ratio control can be performed more reliably and accurately.

Preferably, the exhaust purification apparatus of the present invention involving the above-described high-pass filter processing further comprises factor acquisition means for acquiring a value of a factor which affects the flow rate (volume per unit time) of exhaust gas flowing through the exhaust passage, wherein the main-feedback control means is configured to change the cutoff frequency of the high-pass filter processing in accordance with the acquired value of the factor. Examples of the factor which affects the flow rate of exhaust gas include, but are not limited to, engine speed and engine load (a value corresponding to an intake-air quantity of the engine per intake stroke).

In general, a concentration-cell-type (electromotive-force-type) oxygen concentration sensor, which is relatively inexpensive, is often used as a downstream air-fuel-ratio sensor. Such a downstream air-fuel-ratio sensor (concentration-cell-type oxygen concentration sensor) has characteristics such that once the output of the sensor assumes a lean-side value, this lean-side value is maintained unless a relatively large quantity of unburned HC or CO flows out of the catalyst unit, and the lean-side value changes suddenly to a rich-side value when a relatively large quantity of unburned HC or CO has started to flow out of the catalyst unit. Similarly, once the output of the sensor assumes a rich-side value, this rich-side value is maintained unless a relatively large quantity of $NO_x$ flows out of the catalyst unit, and the rich-side value changes suddenly to a lean-side value when a relatively large quantity of $NO_x$ has started to flow out of the catalyst unit.

Accordingly, in a case where the air-fuel ratio of the engine is feedback-controlled by means of the sub-feedback control means in such a manner that the air-fuel ratio on the downstream side of the catalyst unit becomes the stoichiometric air-fuel ratio, when the output of the downstream air-fuel-ratio sensor assumes a lean-side value, the air-fuel ratio of the engine is controlled toward the rich side, with the result that the quantity of oxygen stored in the catalyst unit (hereinafter referred to as "oxygen storage quantity") gradually decreases. This condition continues until a relatively large quantity of unburned HC or CO starts to flow out of the catalyst unit upon the oxygen storage quantity of the catalyst unit having reached substantially "0."

When a relatively large quantity of unburned HC or CO starts to flow out of the catalyst unit, the output of the downstream air-fuel ratio sensor changes suddenly from the lean-side value to a rich-side value. After that, the air-fuel ratio of the engine is controlled toward the lean side, with the result that the oxygen storage quantity of the catalyst unit gradually increases from the substantially "0" quantity. This condition continues until a relatively large quantity of $NO_x$ starts to flow out of the catalyst unit upon the oxygen storage quantity of the catalyst unit having reached a quantity near the maximum quantity of oxygen that can be stored in the catalyst unit (hereinafter referred to as the "maximum oxygen storage quantity"). When a relatively large quantity of $NO_x$ starts to flow out of the catalyst unit, the output of the downstream air-fuel ratio sensor again assumes a lean-side value. As a result, as described above, the air-fuel ratio of the engine is again controlled toward the rich side, and thus, the oxygen storage quantity of the catalyst unit again decreases from the maximum oxygen storage quantity.

From the above-described phenomenon, it can be said that the frequency of air-fuel ratio variation appearing on the downstream side of the catalyst unit tends to coincide with a frequency at which the oxygen storage quantity of the catalyst unit varies periodically within the range from "0" to the "maximum oxygen storage quantity" (hereinafter referred to as the "variation frequency of oxygen storage quantity").

Meanwhile the "variation frequency of oxygen storage quantity" changes in accordance with the excess/deficient quantity of oxygen per unit time within exhaust gas flowing into the catalyst unit (accordingly, the changing speed of oxygen storage quantity). Further, the excess/deficient quantity of oxygen per unit time within exhaust gas flowing into the catalyst unit changes in accordance with the flow speed (flow rate) of exhaust gas flowing through the exhaust passage. Accordingly, the frequency of air-fuel ratio variation appearing on the downstream side of the catalyst unit can change in accordance with the flow rate of exhaust gas flowing through the exhaust passage.

In view of the above, in order to prevent the above-described generation of interference between the air-fuel ratio controls of the engine in a more reliable manner, the cutoff frequency (the above-described predetermined frequency) of the high-pass filter—which cuts low frequency components of variation in the output value of the upstream air-fuel-ratio sensor, the low frequency components having frequencies which are not higher than a predetermined frequency and which may appear as variations in the air-fuel ratio on the downstream side of the catalyst unit—is preferably set to change in accordance with the flow rate of exhaust gas passing through the exhaust passage.

Therefore, when the above-described configuration for changing the cutoff frequency of the high-pass filter processing in accordance with the value of a factor which affects the flow rate of exhaust gas passing through the exhaust passage is employed, the cutoff frequency of the high-pass filter processing can be increased as the value of the factor changes toward a value corresponding to a higher exhaust gas flow rate, whereby the above-described generation of interference between the air-fuel ratio controls of the engine can be prevented in a more reliable manner.

Preferably, the exhaust purification apparatus of the present invention involving the above-described high-pass filter processing further comprises deterioration-index-value acquisition means for acquiring a deterioration index value which represents the degree of deterioration of the catalyst unit, wherein the main-feedback control means is configured to change the cutoff frequency of the high-pass filter processing in accordance with the acquired deterioration index value. Examples of the deterioration index value include, but are not limited to, the maximum oxygen storage quantity of the catalyst unit, and the ratio between a variation span of the output of the upstream air-fuel ratio sensor and a variation span of the output of the downstream air-fuel ratio sensor (span ratio).

The above-described frequency of air-fuel ratio variation appearing on the downstream side of the catalyst unit; i.e., the "variation frequency of oxygen storage quantity," also changes in accordance with the maximum oxygen storage quantity of the catalyst unit, within which the oxygen storage quantity of the catalyst unit can vary. In other words, even when the flow rate of exhaust gas flowing through the exhaust passage is constant, the variation frequency of oxygen storage quantity increases as the maximum oxygen storage quantity of the catalyst unit decreases. Further, the maximum oxygen storage quantity of the catalyst unit decreases as deterioration of the catalyst unit proceeds. Accordingly, the frequency of air-fuel ratio variation appearing on the downstream side of the catalyst unit can change in accordance with the degree of deterioration of the catalyst unit (e.g., the maximum oxygen storage quantity of the catalyst unit).

In view of the above, when the above-described configuration for changing the cutoff frequency of the high-pass filter processing in accordance with the deterioration index value which represents the degree of deterioration of the catalyst unit is employed, the cutoff frequency of the high-pass filter processing can be increased as the deterioration index value changes toward a value corresponding to a higher degree of deterioration of the catalyst unit, whereby the above-described generation of interference between the air-fuel ratio controls of the engine can be prevented in a more reliable manner.

When the exhaust purification apparatus of the present invention involves the above-described low-pass filter processing in addition to the above-described high-pass filter processing, the apparatus is preferably configured to change not only the cutoff frequency of the high-pass filter processing but also the cutoff frequency of low-pass filter processing, in accordance with a value of a factor which affects the flow rate of exhaust gas passing through the exhaust passage or a deterioration index value which represents the degree of deterioration of the catalyst unit.

As described above, the frequency of air-fuel ratio variation appearing on the downstream side of the catalyst unit changes in accordance with the value of a factor which affects the flow rate of exhaust gas passing through the exhaust passage or the deterioration index value which represents the degree of deterioration of the catalyst unit. Therefore, the variation frequency of output of the downstream air-fuel ratio sensor controlled by means of the sub-feedback control means can change in accordance with these values. Therefore, the cutoff frequency of the low-pass filter processing is preferably set to change in accordance with these values. Accordingly, through employment of the above-described configuration, the above-described generation of interference between the air-fuel ratio controls of the engine can be prevented in a more reliable manner.

Furthermore, in the exhaust purification apparatus of the present invention, when the value having been subjected to high-pass-filter processing is used for the main-feedback control, the sub-feedback control means is preferably configured to calculate the sub-feedback control quantity on the basis of at least a time-integration value of a value determined on the basis of the deviation of the output value of the downstream air-fuel-ratio sensor from the predetermined downstream-side target value; and the main-feedback control means preferably includes dead-band setting means for setting an output value to zero when an input value falls within a predetermined range including zero, and for setting the output value to a value corresponding to the input value when the input value falls outside the predetermined range. The main-feedback control means calculates an integral-processed main-feedback control quantity on the basis of a time-integration value of the output value of the dead-band setting means at the time when the value (before passing through the high-pass filter) determined on the basis of the deviation of the output value of the upstream air-fuel-ratio sensor from the predetermined upstream-side target value is applied as the input value of the dead-band setting means. The main-feedback control means corrects the quantity of fuel injected by the fuel injection means, on the basis of a regular main-feedback control quantity obtained by adding the integral-processed main-feedback control quantity to the main-feedback control quantity, to thereby feedback-control the air-fuel ratio of the engine.

In the exhaust purification apparatus of the present invention, in order to converge the air-fuel ratio of the engine to a target air-fuel ratio while compensating an error of the fuel injection means (e.g., an injector) (the difference between instructed fuel injection quantity and actual fuel injection quantity) and an error of an intake-air flow rate sensor (e.g., an air flowmeter) used to calculate (instructed) fuel injection quantity (the difference between measured intake-air flow rate and actual intake-air flow rate), integral processing (I processing), which is processing for calculating a feedback control quantity on the basis of a time-integration value of the deviation of the output value of the air-fuel ratio sensor from the predetermined target value, must be performed at least in one of the main-feedback control and the sub-feedback control.

However, the high-pass filter processing achieves a function equivalent to the derivative processing (D processing); therefore, even when the main-feedback controller executes processing including the above-mentioned integral processing (e.g., proportional plus integral (PI) process), such integral processing is not performed substantially in the main-feedback control, if the value having passed through the high-pass filter is used as an input value of the main-feedback controller. Accordingly, in the sub-feedback control, the sub-feedback control quantity must be calculated on the basis of at least a time-integration value of the deviation of the output value of the downstream air-fuel-ratio sensor from the predetermined downstream-side target value.

However, due to influence of the above-described oxygen storing function of the catalyst unit, a change in the air-fuel ratio of the engine appears, with a slight delay, as a change in the air-fuel ratio of exhaust gas on the downstream side of the catalyst unit. Therefore, in the case where the error of the fuel injection means or the like increases abruptly, the error of the fuel injection means or the like cannot be compensated immediately by the sub-feedback control only. As a result, the emission of harmful substances may increase temporarily.

A conceivable configuration for coping with the above-problem is to provide, in the main-feedback control circuit, an integration controller (I controller) dedicated for integral processing, which is disposed in parallel to the main-feedback controller (e.g., a PI controller). The integration controller uses, as an input value, the deviation of the output value of the upstream air-fuel-ratio sensor from the predetermined upstream-side target value before passing through the high-pass filter. However, if the main-feedback control circuit is configured such that the deviation is input to the integration controller as is, the above-described problem of interference between air-fuel ratio controls of the engine arises again.

However, in the case where the deviation assumes a relatively large value stemming from a large deviation of the air-fuel ratio of the engine from the stoichiometric air-fuel ratio, the possibility of occurrence of the above-described problem of interference between air-fuel ratio controls of the engine is low, because the output value of the upstream air-fuel-ratio sensor and the output value of the downstream air-fuel-ratio sensor are highly likely to indicate air-fuel ratios having deviated in the same direction from the stoichiometric air-fuel ratio.

Accordingly, in the case where the above-described configuration is employed, only when the value determined on the basis of the deviation of the output value of the upstream air-fuel-ratio sensor from the predetermined upstream-side target value before passing through the high-pass filter falls outside the predetermined range set by the dead-band setting means (i.e., when the possibility of occurrence of the above-described problem of interference between air-fuel ratio controls of the engine is low), the value determined on the basis of the deviation is subjected to integral processing, and is immediately reflected in the regular main-feedback control quantity. Accordingly, in the case where the error of the fuel injection means or the like abruptly increases, the error of the fuel injection means or the like is immediately compensated by the main-feedback control.

Meanwhile, in the sub-feedback control, the value determined on the basis of the deviation of the output value of the downstream air-fuel-ratio sensor from the predetermined downstream-side target value is always subjected to integral processing, and reliably reflected in the sub-feedback control quantity. Accordingly, when the value determined on the basis of the deviation of the output value of the upstream air-fuel-ratio sensor from the predetermined upstream-side target value falls within the predetermined range (i.e., when the possibility of occurrence of the above-described problem of interference between air-fuel ratio controls of the engine is high), the error of the fuel injection means or the like is reliably compensated by the sub-feedback control only, without causing the above-described problem of interference between air-fuel ratio controls of the engine.

In the exhaust purification apparatus of the present invention, the main-feedback control means is preferably configured to change the predetermined upstream-side target value in accordance with the sub-feedback control quantity calculated by the sub-feedback control means. Under this configuration, when the target air-fuel ratio is changed, only the downstream-side target value is required to change in accordance with the changed target air-fuel ratio, and the upstream-side target value is not required to change. Accordingly, processing required to change the target air-fuel ratio can be simplified.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of an air-fuel-ratio control apparatus including an exhaust purification apparatus for an internal combustion engine according to the present invention will be described with reference to the drawings.

Figure 1:
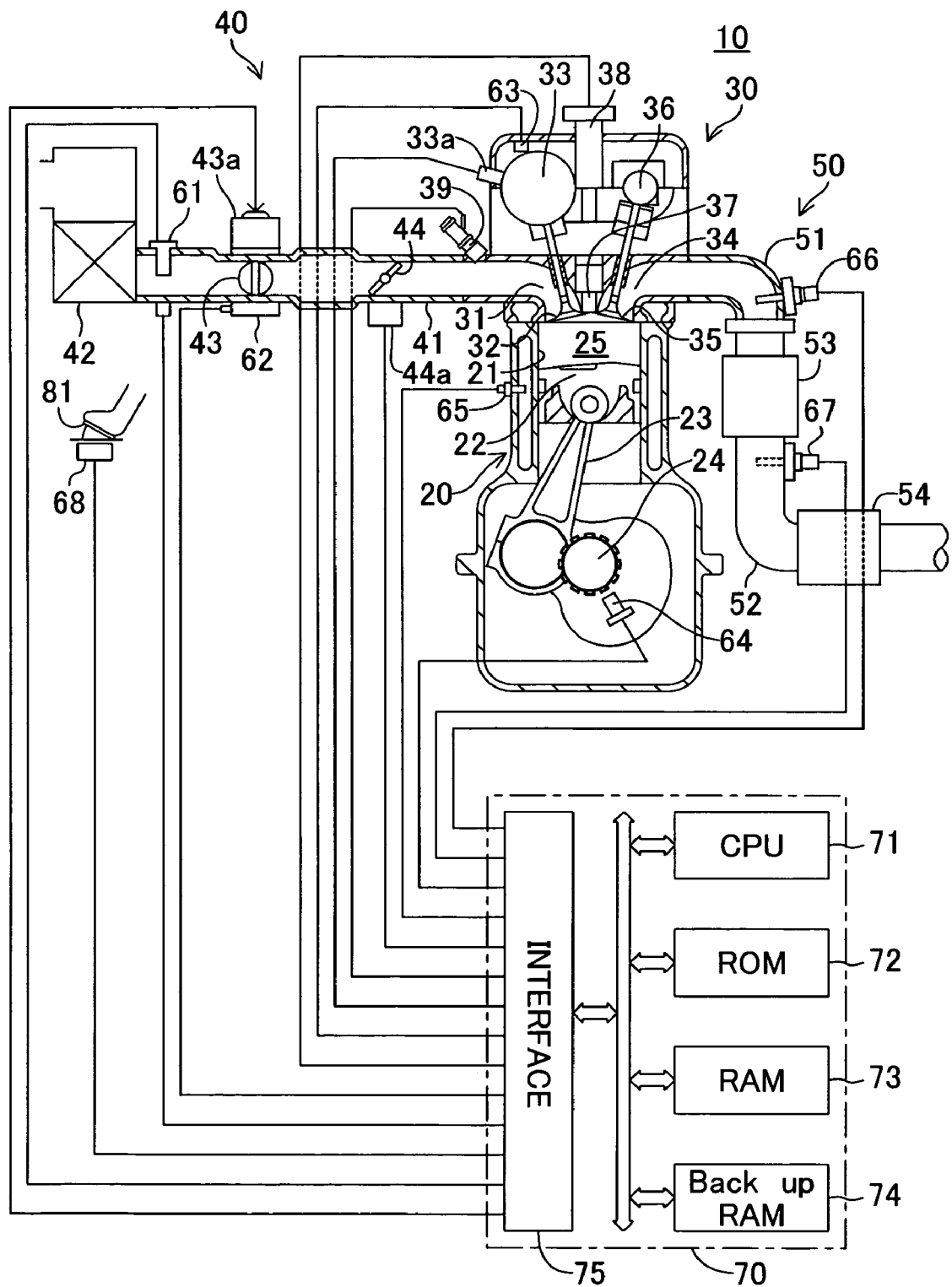
FIG. 1 is a schematic view of an internal combustion engine to which an air-fuel-ratio control apparatus (exhaust purification apparatus) according to a first embodiment of the present invention is applied.

First Embodiment:

FIG. 1 shows a schematic configuration of a system configured such that an air-fuel-ratio control apparatus according to a first embodiment of the present invention is applied to a spark-ignition multi-cylinder (e.g., 4-cylinder) internal combustion engine 10. The internal combustion engine 10 includes a cylinder block section 20 including a cylinder block, a cylinder block lower-case, an oil pan, etc.; a cylinder head section 30 fixed on the cylinder block section 20; an intake system 40 for supplying gasoline-air mixture to the cylinder block section 20; and an exhaust system 50 for discharging exhaust gas from the cylinder block section 20 to the exterior of the engine.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and the head of the piston 22, together with the cylinder head section 30, form a combustion chamber 25.

The cylinder head section 30 includes, for each cylinder or all the cylinders, an intake port 31 communicating with the combustion chamber 25; an intake valve 32 for opening and closing the intake port 31; a variable intake timing unit 33 including an intake cam shaft for driving the intake valve 32 and adapted to continuously change the phase angle of the intake cam shaft; an actuator 33a of the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector (fuel injection means) 39 for injecting fuel into the intake port 31.

The intake system 40 includes an intake pipe 41 including an intake manifold, communicating with the intake port 31, and forming an intake passage together with the intake port 31; an air filter 42 provided at an end portion of the intake pipe 41; a throttle valve 43 provided within the intake pipe 41 and adapted to vary the cross-sectional opening area of the intake passage; a throttle valve actuator 43a, which consists of a DC motor and serves as throttle valve drive means; a swirl control valve (hereinafter referred to as "SCV") 44; and an SCV actuator 44a, which consists of a DC motor.

The exhaust system 50 includes an exhaust manifold 51 communicating with the corresponding exhaust port 34; an exhaust pipe 52 connected to the exhaust manifold 51 (in actuality, connected to a merge portion where a plurality of the exhaust manifolds 51 communicating with the corresponding exhaust ports 34 merge together); an upstream 3-way catalyst unit 53 (also called upstream catalytic converter or start catalytic converter; however, hereinafter referred to as the "first catalyst unit 53") disposed (interposed) in the exhaust pipe 52; and a downstream 3-way catalyst unit 54 (also called under-floor catalytic converter because it is disposed under the floor of the vehicle; however, hereinafter referred to as the "second catalyst unit 54") disposed (interposed) in the exhaust pipe 52 to be located downstream of the first catalyst unit 53. The exhaust port 34, the exhaust manifold 51, and the exhaust pipe 52 form an exhaust passage.

Meanwhile, this system includes a hot-wire air flowmeter 61; a throttle position sensor 62; a cam position sensor 63; a crank position sensor 64; a water temperature sensor 65; an air-fuel-ratio sensor 66 (hereinafter referred to as the "upstream air-fuel-ratio sensor 66") disposed in the exhaust passage to be located upstream of the first catalyst unit 53 (in the present embodiment, located at the merge portion where the exhaust manifolds 51 merge together); an air-fuel-ratio sensor 67 (hereinafter referred to as the "downstream air-fuel-ratio sensor 67") disposed in the exhaust passage to be located between the first catalyst unit 53 and the second catalyst unit 54; and an accelerator opening sensor 68.

Figure 2:
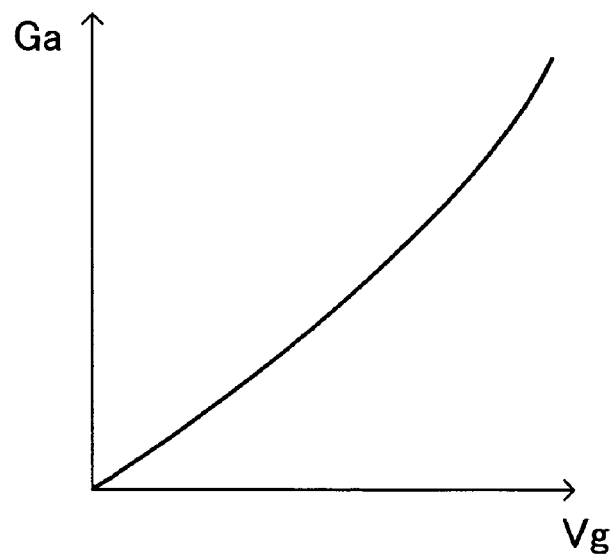
FIG. 2 is a graph showing the relationship between output voltage of an air flowmeter shown in FIG. 1 and measured intake-air flow rate.

The hot-wire air flowmeter 61 outputs a voltage Vg corresponding to the mass flow rate (mass per unit time) of intake air flowing through the intake pipe 41. FIG. 2 shows the relationship between output Vg of the air flowmeter 61 and measured intake-air quantity (flow rate) Ga. The throttle position sensor 62 detects the opening of the throttle valve 43 and outputs a signal indicative of the throttle-valve opening TA. The cam position sensor 63 generates a signal that assumes the form of a single pulse (G2 signal) every time the intake cam shaft rotates by 90° (i.e., every time the crankshaft 24 rotates by 180°). The crank position sensor 64 outputs a signal that assumes the form of a narrow pulse every 10° rotation of the crankshaft 24 and assumes the form of a wide pulse every 360° rotation of the crankshaft 24. This signal indicates the engine speed NE. The water temperature sensor 65 detects the temperature of cooling water for the internal combustion engine 10 and outputs a signal indicative of the cooling-water temperature THW.

Figure 3:
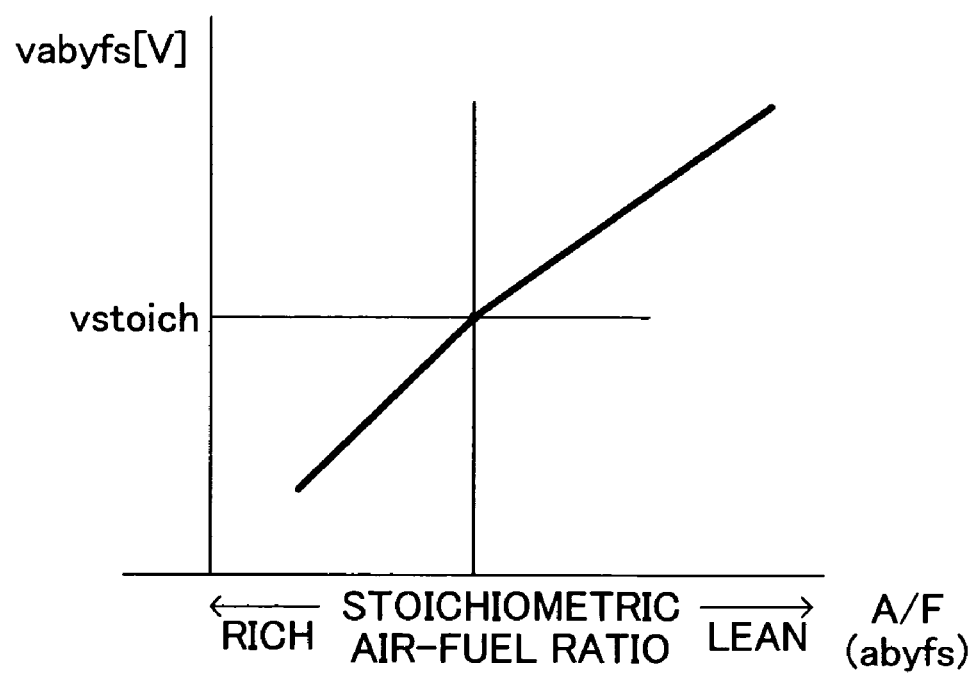
FIG. 3 is a graph showing the relationship between output voltage of an upstream air-fuel-ratio sensor shown in FIG. 1 and measured air-fuel ratio.

The upstream air-fuel-ratio sensor 66 is a limiting-current-type oxygen concentration sensor. As shown in FIG. 3, the upstream air-fuel-ratio sensor 66 outputs a current corresponding to the measured air-fuel ratio A/F, and outputs a voltage value vabyfs, which is a voltage corresponding to the current. When the air-fuel ratio is equal to the stoichiometric air-fuel ratio, the voltage value vabyfs becomes an upstream-side target value vstoich. As is apparent from FIG. 3, the upstream air-fuel-ratio sensor 66 can accurately detect the air-fuel ratio A/F over a wide range.

Figure 4:
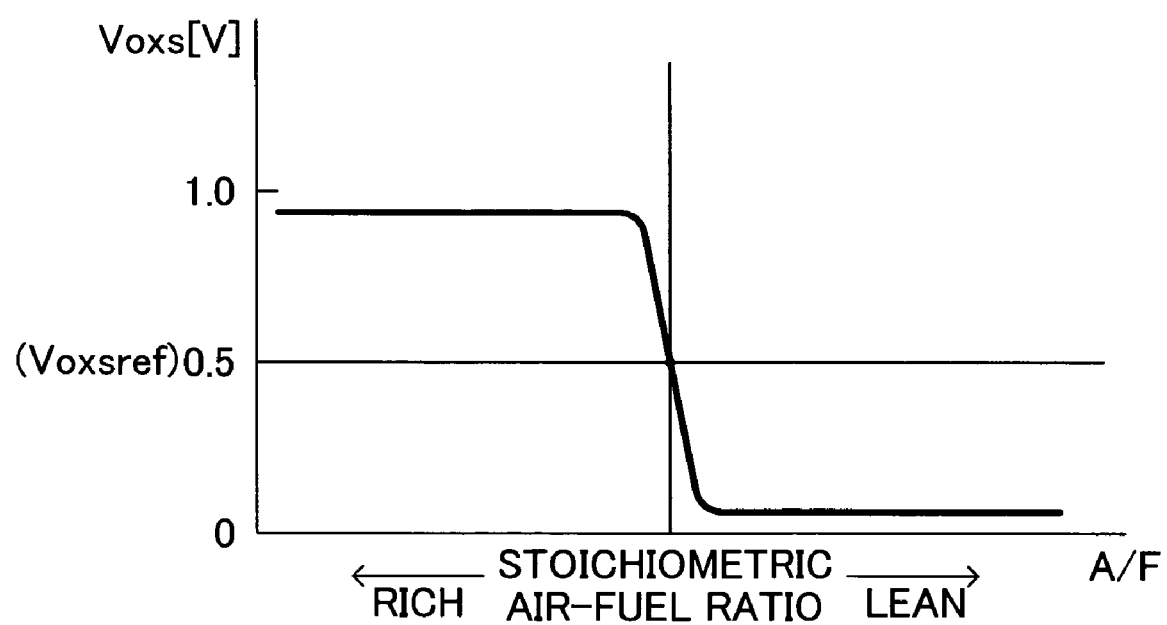
FIG. 4 is a graph showing the relationship between output voltage of a downstream air-fuel-ratio sensor shown in FIG. 1 and measured air-fuel ratio.

The downstream air-fuel-ratio sensor 67 is an electromotive-force-type (concentration-cell-type) oxygen concentration sensor. As shown in FIG. 4, the downstream air-fuel-ratio sensor 67 outputs an output value Voxs, which is a voltage which changes sharply in the vicinity of the stoichiometric air-fuel ratio. More specifically, the downstream air-fuel-ratio sensor 67 outputs about 0.1 V when the measured air-fuel ratio is on the lean side with respect to the stoichiometric air-fuel ratio, about 0.9 V when the measured air-fuel ratio is on the rich side with respect to the stoichiometric air-fuel ratio, and 0.5 V when the measured air-fuel ratio is equal to the stoichiometric air-fuel ratio. The accelerator opening sensor 68 detects an operation amount of an accelerator pedal 81 operated by a driver, and outputs a signal representing the operation amount Accp of the accelerator pedal 81.

An electric control device 70 is a microcomputer, and includes the following components, which are mutually connected via a bus: a CPU 71; ROM 72 in which routines (programs) to be executed by the CPU 71, tables (lookup tables, maps), constants, and the like are stored in advance; RAM 73 in which the CPU 71 stores data temporarily as needed; backup RAM 74, which stores data while power is on and retains the stored data even while power is held off; and an interface 75 including AD converters. The interface 75 is connected to the sensors 61 to 68. Signals from the sensors 61 to 68 are supplied to the CPU 71 through the interface 75. Drive signals from the CPU 71 are sent, through the interface 75, to the actuator 33a of the variable intake timing unit 33, the igniter 38, the injector 39, the throttle valve actuator 43a, and the SCV actuator 44a.

Outline of Air-Fuel Ratio Feedback Control:

Next will be described the outline of feedback control of the air-fuel ratio of the engine, which is performed by the air-fuel-ratio control apparatus including the exhaust purification apparatus configured as described above.

The first catalyst unit 53 (the second catalyst unit 54 as well) oxidizes HC and CO, and reduces $NO_x$, to thereby remove these harmful substances with high efficiency, when the air-fuel ratio of gas following thereinto is equal to the stoichiometric air-fuel ratio. Further, the first catalyst unit 53 has a function for storing and releasing oxygen (oxygen storing function, oxygen storing-releasing function), and this oxygen storing-releasing function enables the first catalyst unit 53 to remove HC and CO, and $NO_x$ even when the air-fuel ratio deviates from the stoichiometric air-fuel ratio to some degree. Specifically, when the air-fuel ratio of the engine shifts toward the lean side with a resultant increase in the quantity of $NO_x$ contained in the gas flowing into the first catalyst unit 53, the first catalyst unit 53 captures oxygen molecules from $NO_x$ and stores the oxygen molecules, and simultaneously reduces $NO_x$ to thereby remove $NO_x$. When the air-fuel ratio of the engine shifts toward the rich side with a resultant increase in the quantity of HC and CO contained in the gas flowing into the first catalyst unit 53, the 3-way catalyst unit imparts (releases) stored oxygen molecules to HC and CO so as to oxidize HC and CO, to thereby remove the same.

Accordingly, in order to efficiently remove the large quantity of HC and CO continuously flowing into the first catalyst unit 53, the first catalyst unit 53 must hold a large quantity of stored oxygen. In contrast, in order to efficiently remove the large quantity of $NO_x$ continuously flowing into the first catalyst unit 53, the first catalyst unit 53 must be in a state in which the first catalyst unit 53 can store a large quantity of oxygen. As can be understood from above, the cleaning performance of the first catalyst unit 53 depends on the maximum quantity of oxygen which the first catalyst unit 53 can store (the maximum oxygen storage quantity).

Meanwhile, a 3-way catalyst such as the catalyst contained in the first catalyst unit 53 deteriorates as a result of poisoning by lead, sulfur, or the like contained in fuel, or heat applied to the catalyst, whereby the maximum oxygen storage quantity gradually decreases. In order to continuously suppress the emission of harmful substances even after the maximum oxygen storage quantity has decreased, the air-fuel ratio of gas discharged from the first catalyst unit 53 (and thus the average air-fuel ratio of gas flowing into the first catalyst unit 53) must be controlled in such a manner that the air-fuel ratio becomes very close to the stoichiometric air-fuel ratio.

In view of the foregoing, the air-fuel-ratio control apparatus of the present embodiment controls the air-fuel ratio of air-fuel mixture supplied to the engine 10 (i.e., the air-fuel ratio of the engine) in accordance with the output value Voxs of the downstream air-fuel-ratio sensor 67 (i.e., the air-fuel ratio as measured downstream of the first catalyst unit) in such a manner that the output value of the downstream air-fuel-ratio sensor 67 becomes equal to a downstream-side target value Voxsref (0.5 V) corresponding to the stoichiometric air-fuel ratio, which serves as a downstream-side target air-fuel ratio.

More specifically, as shown by the functional block diagram of FIG. 5, the air-fuel-ratio control apparatus (hereinafter, may be referred to as the "present apparatus") includes various means A1 to A9, which constitute a portion of the illustrated means A1 to A19. Each of the means A1 to A9 will be described with reference to FIG. 5.

<Calculation of Base Fuel Injection Quantity>

First, cylinder intake air quantity calculation means A1 calculates a cylinder intake air quantity Mc(k), which is the quantity of air taken in a cylinder which is starting an intake stroke this time (hereinafter referred to as the "present intake stroke"), on the basis of the intake-air flow rate Ga measured by the air flowmeter 61, the engine speed NE obtained on the basis of the output of the crank position sensor 64, and a table MAPMc stored in the ROM 72. Notably, the subscript (k) represents that the cylinder intake air quantity is a value regarding the present intake stroke (the same also applies to other physical quantities). The cylinder intake air quantity Mc is stored in the RAM 73 whenever each cylinder starts the intake stroke, in such a manner that the cylinder intake air quantity is related to each intake stroke of each cylinder.

Upstream-side target air-fuel ratio setting means A2 determines an upstream-side target air-fuel ratio abyfr(k), which corresponds to a predetermined upstream-side target value, on the basis of operating conditions of the internal combustion engine 10, such as engine speed NE and throttle-valve opening TA. Except for special cases, the upstream-side target air-fuel ratio abyfr(k) is set to the stoichiometric air-fuel ratio after completion of warming up of the internal combustion engine 10. The upstream-side target air-fuel ratio abyfr is stored in the RAM 73 whenever each cylinder starts the intake stroke, in such a manner that the cylinder intake air quantity is related to each intake stroke of each cylinder.

Base fuel injection quantity calculation means A3 calculates a target cylinder fuel supply quantity Fcr(k) (i.e., base fuel injection quantity Fbase), which is a fuel injection quantity for the present intake stroke required to render the air-fuel ratio of the engine equal to the upstream-side target air-fuel ratio abyfr(k), by dividing the cylinder intake air quantity Mc(k)—obtained by the cylinder intake air quantity calculation means A1—by the upstream-side target air-fuel ratio abyfr(k) set by the upstream-side target air-fuel ratio setting means A2. The target cylinder fuel supply quantity Fcr is stored in the RAM 73 whenever each cylinder starts the intake stroke, in such a manner that the cylinder intake air quantity is related to each intake stroke of each cylinder.

As described above, the present apparatus obtains the base fuel injection quantity Fbase by use of the cylinder intake air quantity calculation means A1, the upstream-side target air-fuel ratio setting means A2, and the base fuel injection quantity calculation means A3.

<Calculation of Fuel Injection Quantity>

First, sub-feedback control fuel injection quantity calculation means A4 obtains a sub-feedback control fuel injection quantity Fbasesb by multiplying the base fuel injection quantity Fbase—obtained by the base fuel injection quantity calculation means A3—by a sub-feedback control coefficient (sub-feedback control quantity) KFi obtained by a PID controller A9, which will be described later.

Fuel injection quantity calculation means A5 obtains a (final) fuel injection quantity Fi in accordance with Equation 1 described below; i.e., by adding a regular main-feedback control quantity DFi, which will be described later, to the sub-feedback control fuel injection quantity Fbasesb. In this manner, the present apparatus causes the injector 39 to inject fuel to a cylinder which starts the present intake stroke, in the fuel injection quantity Fi, which is obtained through correction of the base fuel injection quantity Fbase, the correction being performed by the sub-feedback control fuel injection quantity calculation means A4 and the fuel injection quantity calculation means A5 on the basis of the sub-feedback control coefficient KFi and the regular main-feedback control quantity DFi.

$$Fi = Fbasesb + DFi \quad \text{Eq. 1}$$

<Calculation of Sub-Feedback Control Quantity>

First, as in the case of the above-described upstream-side target air-fuel ratio setting means A2, downstream-side target value setting means A6 determines a downstream-side target value (predetermined downstream-side target value) Voxsref, which corresponds to a downstream-side target air-fuel ratio, on the basis of operating conditions of the internal combustion engine 10, such as engine speed NE and throttle-valve opening TA. Except for special cases, the downstream-side target value Voxsref is set to 0.5 (V), which is a value corresponding to the stoichiometric air-fuel ratio after completion of warm-up of the internal combustion engine 10 (see FIG. 4). Further, in the present embodiment, the downstream-side target value Voxsref is set in such a manner that the downstream-side target air-fuel ratio corresponding to the downstream-side target value Voxsref is always equal to the above-described upstream-side target air-fuel ratio abyfr(k).

Output deviation calculation means A7 obtains an output deviation DVoxs in accordance with Equation 2 described below; i.e., by subtracting the output value Voxs of the downstream air-fuel-ratio sensor 67 at this moment from the downstream-side target value Voxsref presently set by the downstream-side target value setting means A6.

$$DVoxs = Voxsref - Voxs \quad \text{Eq. 2}$$

Figure 6:
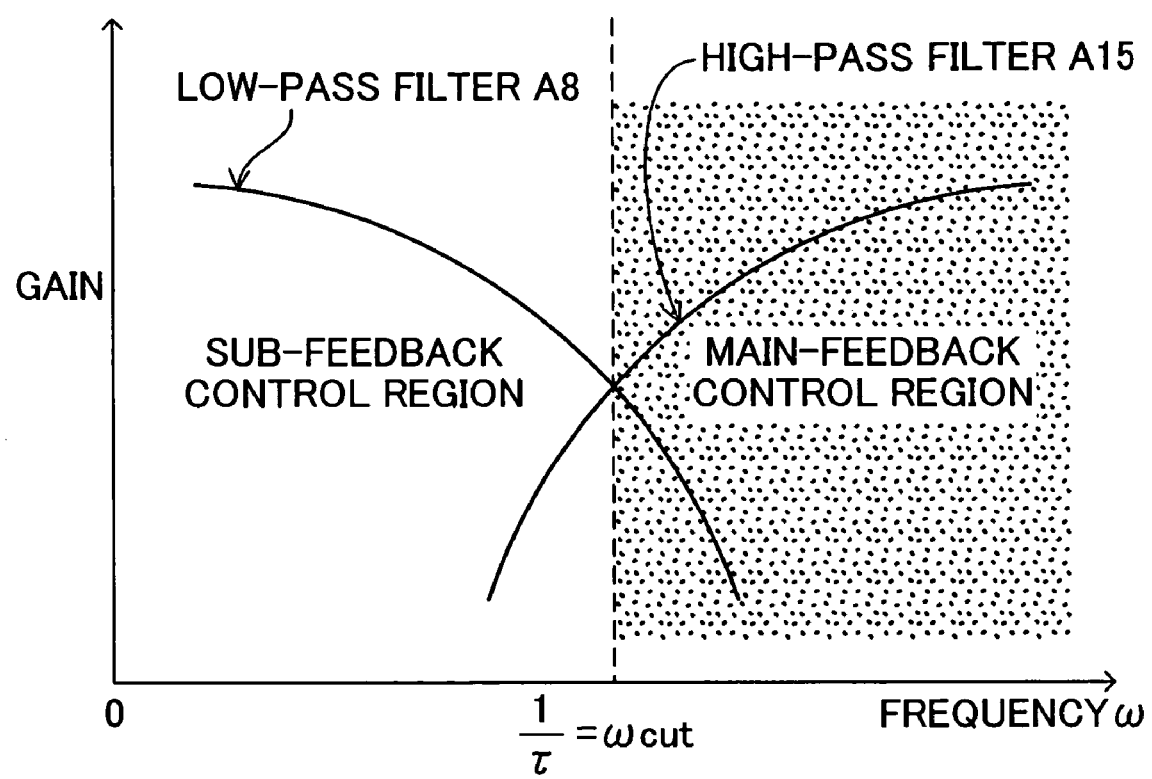
FIG. 6 is a graph showing the relationship between the frequencies of frequency components contained in signals fed to a high-pass filter and a low-pass filter, respectively, shown in FIG. 1 and gains imparted to the frequency components when the frequency components pass through the respective filters.

A low-pass filter A8 is a first-order filter as expressed by the following Equation 3, which represents the characteristics of the filter by use of a Laplace operator s. In Equation 3, $\tau$ is a time constant. FIG. 6 shows the relationship between the frequency $\omega$ of each frequency component contained in a signal input to the low-pass filter A8 and the gain for the component of the frequency $\omega$ passing through the low-pass filter A8. As shown in FIG. 6, the low-pass filter A8 substantially prohibits passage of high-frequency components whose frequencies are higher than the cutoff frequency $(1/\tau) = \omega cut$.

$$1/(1+\tau s) \quad \text{Eq. 3}$$

The low-pass filter A8 receives the output deviation DVoxs obtained by the output deviation calculation means A7, and outputs a low-pass-filter passed output deviation DVoxslow, which is a value obtained by subjecting the output deviation DVoxs to low-pass filter processing in accordance with the above-described Equation 3. Accordingly, the low-pass-filter passed output deviation DVoxslow is a value obtained by performing low-pass filter processing for the deviation of the output value Voxs of the downstream air-fuel-ratio sensor 67 from the predetermined downstream-side target value Voxsref.

The PID controller A9 obtains, as a sub-feedback control quantity, a sub-feedback control coefficient KFi (>0) in accordance with Equation 4 described below; i.e., by performing proportional plus integral plus derivative processing (PID processing) for the low-pass-filter passed output deviation DVoxslow, which is the output of the low-pass filter A8.

$$KFi = (Kp \cdot DVoxslow + Ki \cdot SDVoxslow + Kd \cdot DDVoxslow) + 1 \quad \text{Eq. 4}$$

In Equation 4, Kp is a preset proportional gain (proportional constant), Ki is a preset integral gain (integral constant), and Kd is a preset derivative gain (derivative constant). Further, SDVoxslow is a value obtained through integration of the low-pass-filter passed output deviation DVoxslow with respect to time, and DDVoxslow is a value obtained through differentiation of the low-pass-filter passed output deviation DVoxslow with respect to time.

In the above-described manner, the present apparatus obtains the sub-feedback control quantity KFi on the basis of the output deviation DVoxs (in actuality, the low-pass-filter passed output deviation DVoxslow), which is the deviation of the output value Voxs of the downstream air-fuel-ratio sensor 67 from the downstream-side target value Voxsref, and multiplies the base fuel injection quantity Fbase by the sub-feedback control quantity KFi, to thereby correct the base fuel injection quantity Fbase, independently of correction of the base fuel injection quantity Fbase by main-feedback control to be described later (on the basis of the above-described regular main-feedback control quantity DFi).

For example, when the output value Voxs of the downstream air-fuel-ratio sensor 67 indicates an air-fuel ratio which is on the lean side with respect to the stoichiometric air-fuel ratio because the average air-fuel ratio of the engine is on the lean side, the output deviation DVoxs obtained by the output deviation calculation means A7 assumes a positive value (see FIG. 4), so that the sub-feedback control coefficient KFi obtained by the PID controller A9 becomes greater than "1." As a result, the sub-feedback control fuel injection quantity Fbasesb obtained by the sub-feedback control fuel injection quantity calculation means A4 becomes greater than the base fuel injection quantity Fbase, and therefore, the (final) fuel injection quantity Fi obtained by the fuel injection quantity calculation means A5 also becomes greater than the base fuel injection quantity Fbase, whereby the air-fuel ratio of the engine is controlled toward the rich side.

In contrast, when the output value Voxs of the downstream air-fuel-ratio sensor 67 indicates an air-fuel ratio which is on the rich side with respect to the stoichiometric air-fuel ratio because the average air-fuel ratio of the engine is on the rich side, the output deviation DVoxs obtained by the output deviation calculation means A7 assumes a negative value, so that the sub-feedback control coefficient KFi obtained by the PID controller A9 becomes smaller than "1" (and greater than "0"). As a result, the sub-feedback control fuel injection quantity Fbasesb obtained by the sub-feedback control fuel injection quantity calculation means A4 becomes smaller than the base fuel injection quantity Fbase, and therefore, the (final) fuel injection quantity Fi obtained by the fuel injection quantity calculation means A5 also becomes smaller than the base fuel injection quantity Fbase, whereby the air-fuel ratio of the engine is controlled toward the lean side.

Since the PID controller A9 contains the integral term Ki·SDVoxslow, under a steady state the output deviation DVoxs is assured of becoming zero. In other words, the steady state deviation of the output value Voxs of the downstream air-fuel-ratio sensor 67 from the downstream-side target value Voxsref becomes zero. Further, in the steady state, since both the proportional term Kp·DVoxslow and the derivative term Kd·DDVoxslow become zero as a result of the output deviation DVoxs becoming zero, the sub-feedback control coefficient KFi becomes a value obtained by adding "1" to the value of the integral term Ki·SDVoxslow. This value is determined on the basis of the time integration value of the deviation of the output value Voxs of the downstream air-fuel-ratio sensor 67 from the downstream-side target value Voxsref. Through execution of such integration processing in the PID controller A9, the error of the injector 39 (the difference between fuel injection quantity Fi, which is an instructed fuel injection quantity, and actual fuel injection quantity) and the error of the air flowmeter 61 (the difference between measured intake-air flow rate Ga and actual intake-air flow rate) are compensated, and in the steady state, the air-fuel ratio on the downstream side of the first catalyst unit 53 (i.e., the air-fuel ratio of the engine) converges to the downstream-side target air-fuel ratio (i.e., the stoichiometric air-fuel ratio) corresponding to the downstream-side target value Voxsref. The sub-feedback control fuel injection quantity calculation means A4, the downstream-side target value setting means A6, the output deviation calculation means A7, the low-pass filter A8, and the PID controller A9 correspond to sub-feedback control means.

<Main-feedback Control>

As described previously, the first catalyst unit 53 has the above-described oxygen storing function. Therefore, among variations in the air-fuel ratio of exhaust gas on the upstream side of the first catalyst unit 53, a high frequency component(s) having a relatively high frequency (e.g., higher than the above-described cutoff frequency ωcut) and a low frequency component(s) having a relatively low frequency (e.g., not higher than the above-described cutoff frequency ωcut) and a relatively small amplitude (deviation from the stoichiometric air-fuel ratio) are completely absorbed by the oxygen storing function of the first catalyst unit 53, and do not appear as variations in the air-fuel ratio of exhaust gas on the downstream side of the first catalyst unit 53. Accordingly, for example, in the case where the internal combustion engine 10 is in a transitional operating state, and the air-fuel ratio of exhaust gas changes drastically at a high frequency higher than the above-described cutoff frequency ωcut, such a variation in the air-fuel ratio does not appear in the output value Voxs of the downstream air-fuel-ratio sensor 67, and the sub-feedback control means cannot perform air-fuel ratio control for air-fuel ratio variations of frequencies higher than the cutoff frequency ωcut. Accordingly, in order to perform reliable compensation for abrupt changes in air-fuel ratio in such a transitional operating state, main-feedback control, which is air-fuel ratio control on the basis of the output value vabyfs of the upstream air-fuel-ratio sensor 66, must be performed.

Meanwhile, among variations in the air-fuel ratio of exhaust gas on the upstream side of the first catalyst unit 53, a low frequency component(s) having a relatively low frequency (e.g., not higher than the above-described cutoff frequency ωcut) and a relatively large amplitude is not completely absorbed by the oxygen storing function of the first catalyst unit 53, and appears, with slight delay, as a variation in the air-fuel ratio of exhaust gas on the downstream side of the first catalyst unit 53. As a result, in some cases, the output value vabyfs of the upstream air-fuel-ratio sensor 66 and the output value Voxs of the downstream air-fuel-ratio sensor 67 indicate air-fuel ratios having deviated from the stoichiometric air-fuel ratio in opposite directions. Accordingly, in such a case, if air-fuel ratio control of the engine on the basis of the main-feedback control (i.e., on the basis of the regular main-feedback control quantity DFi, which will be described later) and air-fuel ratio control of the engine on the basis of the sub-feedback control (i.e., on the basis of the above-described sub-feedback control quantity KFi) are performed simultaneously, these two air-fuel ratio controls interfere with each other, with the result that air-fuel ratio control of the engine cannot be performed properly.

In view of the foregoing, among respective frequency components of variation in the output value vabyfs of the upstream air-fuel-ratio sensor 66, low frequency components whose frequencies are not greater than a predetermined frequency (in the present embodiment, the cutoff frequency ωcut) and which may appear as variations in the air-fuel ratio on the downstream side of the first catalyst unit 53 are cut before the output value vabyfs of the upstream air-fuel-ratio sensor 66 is used for the main feedback control. This low frequency component removing operation enables avoidance of generation of interference between air-fuel ratio controls of the engine, along with reliable performance of compensation for an abrupt change in air-fuel ratio in a transitional operating state.

Figure 5:
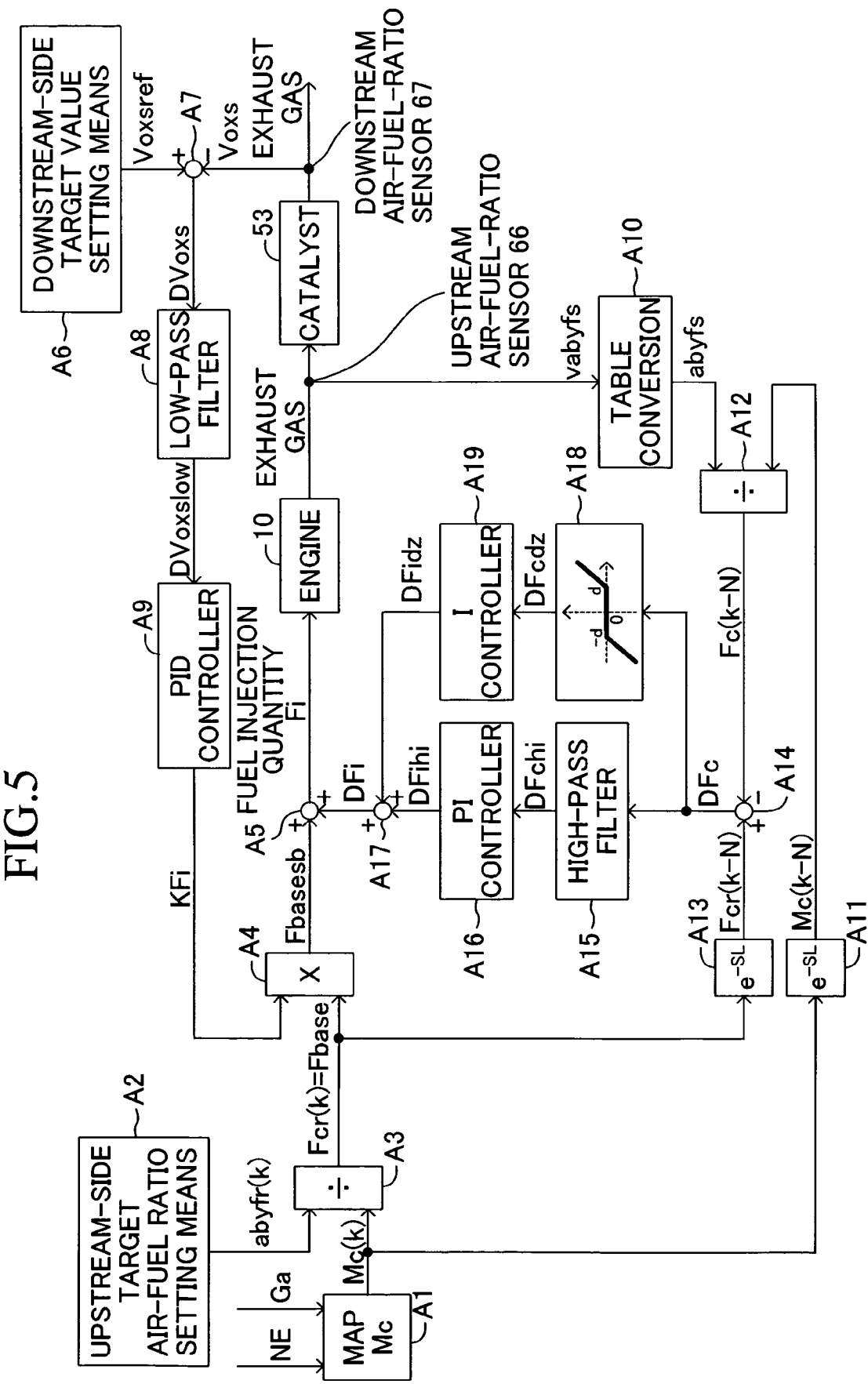
FIG. 5 is a functional block diagram showing functions of the air-fuel-ratio control apparatus shown in FIG. 1 when the air-fuel control apparatus executes air-fuel-ratio feedback control.

In order to achieve the above operation, as shown in the previously-described FIG. 5, the present apparatus includes means A10 to A17. Now, each of these means will be described with reference to FIG. 5.

<Calculation of Main-Feedback Control Quantity>

First, table conversion means A10 obtains a detection air-fuel ratio abyfs (air-fuel ratio presently detected by the upstream air-fuel-ratio sensor 66) on the basis of the output value vabyfs of the upstream air-fuel-ratio sensor 66 and with reference to the table shown in the previously-described FIG. 3, which defines the relationship between air-fuel ratio A/F and output value vabyfs of the upstream air-fuel-ratio sensor 66.

As described above, the RAM 73 stores cylinder intake air quantities Mc which the cylinder intake air quantity calculation means A1 has obtained for each of intake strokes. Cylinder intake-air quantity delay means A11 reads from the RAM 73 a cylinder intake air quantity Mc of the cylinder which has started an intake stroke at N strokes (N intake strokes) before the present point in time, and stores the same as a cylinder intake air quantity Mc(k−N).

Cylinder fuel supply quantity calculation means A12 obtains an actual cylinder fuel supply quantity Fc(k−N) at the time point N strokes before the present point in time, through operation of dividing the cylinder intake air quantity Mc(k−N) at the time point N strokes before the present point in time obtained by the cylinder intake-air quantity delay means A11, by the detection air-fuel ratio abyfs at the present point in time obtained by the table conversion means A10. The value N changes depending on the displacement of the internal combustion engine 10, the distance between the combustion chamber 25 and the upstream air-fuel-ratio sensor 66, and other factors.

The reason why the actual cylinder fuel supply quantity Fc(k−N) at the time point N strokes before the present point in time is obtained through division of the cylinder intake air quantity Mc(k−N) at the time point N strokes before the present point in time by the detection air-ratio abyfs at the present point in time is that air-fuel mixture combusted in the combustion chamber 25 takes a time L corresponding to N strokes to reach the upstream air-fuel-ratio sensor 66.

As described above, the RAM 73 stores target cylinder fuel supply quantities Fcr which the base fuel injection quantity calculation means A3 has obtained for each of intake strokes. Target cylinder fuel supply quantity delay means A13 reads from the RAM 73 a target cylinder fuel supply quantity Fcr at the time point N strokes before the present point in time, and stores the same as a target cylinder fuel supply quantity Fcr(k−N).

Cylinder fuel supply quantity deviation calculation means A14 obtains a cylinder fuel supply quantity deviation DFc in accordance with Equation 5 described below; i.e., by subtracting the actual cylinder fuel supply quantity Fc(k−N) at the time point N strokes before the present point in time obtained by the cylinder fuel supply quantity calculation means A12 from the target cylinder fuel supply quantity Fcr(k−N) at the time point N strokes before the present point in time stored by the target cylinder fuel supply quantity delay means A13. The cylinder fuel supply quantity deviation DFc is a quantity which represents the excessiveness/insufficiency of fuel having been supplied to the cylinder at the time point N strokes before the present point in time, and is determined on the basis of the deviation of the output value vabyfs of the upstream air-fuel-ratio sensor 66 from the upstream-side target value (vstoich shown in FIG. 3 when the upstream-side target air-fuel ratio abyfr is equal to the stoichiometric air-fuel ratio).

$$DFc=Fcr(k-N)-Fc(k-N) \qquad \text{Eq. 5}$$

A high-pass filter A15 is a first-order filter as expressed by the following Equation 6, which represents the characteristics of the filter by use of a Laplace operator s. In Equation 6, $\tau$ is a time constant, which is identical with the time constant $\tau$ of the above-mentioned low-pass filter A8. FIG. 6 shows the relationship between the frequency $\omega$ of each frequency component contained in a signal input to the high-pass filter A15 and the gain for the component of the frequency $\omega$ passing through the high-pass filter A15. As shown in FIG. 6, the high-pass filter A15 substantially prohibits passage of low-frequency components whose frequencies are not higher than the cutoff frequency $(1/\tau)=\omega$cut.

$$1-1/(1+\tau \cdot s) \qquad \text{Eq. 6}$$

The high-pass filter A15 receives the cylinder fuel supply quantity deviation DFc obtained by the cylinder fuel supply quantity deviation calculation means A14, and outputs a high-pass-filter passed cylinder fuel supply quantity deviation DFchi, which is a value obtained by subjecting the cylinder fuel supply quantity deviation DFc to high-pass filter processing in accordance with the above-described Equation 6. Accordingly, the high-pass-filter passed cylinder fuel supply quantity deviation DFchi is a value obtained by performing high-pass filter processing for the deviation of the output value vabyfs of the upstream air-fuel-ratio sensor 66 from the upstream-side target value.

A PI controller A16 obtains a main-feedback control quantity DFihi (which may assume a positive or negative value) in accordance with Equation 7 described below, i.e., by performing proportional plus integral processing (PI processing) for the high-pass-filter passed cylinder fuel supply quantity deviation DFchi, which is the output of the high-pass filter A15. The main-feedback control quantity DFihi is used for compensating excessiveness or insufficiency of fuel supply quantity (excessiveness or insufficiency of only high-frequency components which are higher in frequency than the cutoff frequency $\omega$cut) at the time point N strokes before the present point in time.

$$DFihi=(Gphi \cdot DFchi+Gihi \cdot SDFchi) \cdot KFB \qquad \text{Eq. 7}$$

In Equation 7, Gphi is a preset proportional gain (proportional constant), and Gihi is a preset integral gain (integral constant). SDFchi is a value obtained through integration of the high-pass-filter passed cylinder fuel supply quantity deviation DFchi with respect to time. The coefficient KFB is preferably changed depending on engine speed NE, cylinder intake air quantity Mc, and other factors; however, in the present embodiment, the coefficient KFB is set to "1."

Regular main-feedback control quantity calculation means A17 obtains the regular main-feedback control quantity DFi in accordance with Equation 8 described below; i.e., by adding an integral-processed main-feedback control quantity DFidz, which will be described later, to the above-described main-feedback control quantity DFihi. As described previously, the regular main-feedback control quantity DFi is used by the fuel injection quantity calculation means A5 in order to obtain the final fuel injection quantity Fi.

$$DFi=DFihi+DFidz \qquad \text{Eq. 8}$$

As described above, in the present apparatus, the main-feedback control circuit and the sub-feedback control circuit are connected in parallel to the internal combustion engine 10. The present apparatus obtains the regular main-feedback control quantity DFi on the basis of the high-pass-filter passed cylinder fuel supply quantity deviation DFchi, which is the value obtained by performing high-pass filter processing for a value determined on the basis of the deviation of the output value vabyfs of the upstream air-fuel-ratio sensor 66 from the upstream-side target value corresponding to the upstream-side target air-fuel ratio abyfr; and adds the regular main-feedback control quantity DFi to the sub-feedback control fuel injection quantity Fbasesb, to thereby correct the base fuel injection quantity Fbase, independently of the correction of the base fuel injection quantity Fbase by the above-described sub-feedback control (on the basis of the sub-feedback control coefficient KFi).

For example, when the air-fuel ratio of the engine abrupt changes to the lean side, the detection air-fuel ratio abyfs obtained by the table conversion means A10 shifts to the lean side (assume a larger value) with respect to the upstream-side target air-fuel ratio abyfr set by the upstream-side target air-fuel ratio setting means A2. Therefore, the actual cylinder fuel supply quantity Fc(k−N) obtained by the cylinder fuel supply quantity calculation means A12 becomes smaller than the target cylinder fuel supply quantity Fcr(k−N) obtained by the target cylinder fuel supply quantity delay means A13, whereby the cylinder fuel supply quantity deviation DFc is obtained to be a large positive value. Further, as a result of the abrupt change in the air-fuel ratio of the engine, a signal representing the cylinder fuel supply quantity deviation DFc contains a high-frequency component(s) whose frequency is higher than the cutoff frequency ωcut, and thus the high-pass-filter passed cylinder fuel supply quantity deviation DFchi output from the high-pass filter A15 also assumes a large positive value. Accordingly, the main-feedback control quantity DFihi assume a large positive value, and thus, the regular main-feedback control quantity DFi also assumes a large positive value. As a result, the fuel injection quantity Fi obtained by the fuel injection quantity calculation means A5 becomes greater than the base fuel injection quantity Fbase, whereby the air-fuel ratio of the engine is controlled toward the rich side.

In contrast, when the air-fuel ratio of the engine abruptly changes to the rich side, the detection air-fuel ratio abyfs shifts to the rich side (assumes a smaller value) with respect to the upstream-side target air-fuel ratio abyfr. Therefore, the actual cylinder fuel supply quantity Fc(k−N) becomes greater than the target cylinder fuel supply quantity Fcr(k−N), whereby the cylinder fuel supply quantity deviation DFc is obtained to be a negative value. Further, as a result of the abrupt change in the air-fuel ratio of the engine, a signal representing the cylinder fuel supply quantity deviation DFc contains a high-frequency component(s) whose frequency is higher than the cutoff frequency ωcut, and thus the high-pass-filter passed cylinder fuel supply quantity deviation DFchi also assumes a negative value. Accordingly, the main-feedback control quantity DFihi assumes a negative value, and thus, the regular main-feedback control quantity DFi also assumes a negative value. As a result, the fuel injection quantity Fi becomes smaller than the base fuel injection quantity Fbase, whereby the air-fuel ratio of the engine is controlled toward the lean side. The fuel injection quantity calculation means A5, the table conversion means A10, the cylinder intake-air quantity delay means A11, the cylinder fuel supply quantity calculation means A12, the target cylinder fuel supply quantity delay means A13, the cylinder fuel supply quantity deviation calculation means A14, the high-pass filter A15, the PI controller A16, and the regular main-feedback control quantity calculation means A17 correspond to a portion of the main feedback control means.

In the above-described manner, the sub-feedback control means reliably performs substantial air-fuel ratio control for variations in air-fuel ratio whose frequencies are not higher than the cutoff frequency ωcut and which may appear as variations in the air-fuel ratio on the downstream side of the first catalyst unit 53, and generation of interference between the two air-fuel ratio controls of the engine can be avoided, because low-frequency components whose frequencies are not higher than the cutoff frequency ωcut cannot pass through the high-pass filter A15 and thus are not input to the PI controller A16. Further, since a high-frequency component(s) having a frequency higher than the cutoff frequency ωcut and contained in variation in the air-fuel ratio of the engine (accordingly, variation in the output value vabyfs of the upstream air-fuel-ratio sensor 66) passes through the high-pass filter A15, compensation for abrupt change in the air-fuel ratio in a transitional operating state can be performed quickly and reliably by the main-feedback control means.

<Addition of I Controller>

As described previously, since the PID controller A9 performs integral processing, the sub-feedback control can compensate an error of the injector 39, an error of the air flowmeter 61, etc. However, under the influence of the oxygen storing function of the first catalyst unit 53, a change in the air-fuel ratio of the engine appears, with slight delay, as a change in the air-fuel ratio on the downstream side of the first catalyst unit 53. Therefore, in the case where the error of the injector 39 or the like increases abruptly, the error of the injector 39 or the like cannot be immediately compensated by the sub-feedback control only, with the result that the emission of harmful substances may increase temporarily.

Accordingly, the main-feedback control, which is not influenced by the delay attributable to the oxygen storing function of the first catalyst unit 53, must be configured to immediately compensate the error of the injector 39 or the like. However, since the high-pass filter processing achieves a function equivalent to the derivative processing (D processing), integral processing is substantially not performed in the above-described main-feedback control circuit, in which the value having passed through the high-pass filter A15 is used as an input value of the PI controller A16.

A conceivable configuration for coping with the above-problem is such that an I controller dedicated for integral processing is disposed in parallel to the PI controller A16 in the main-feedback control circuit, and the cylinder fuel supply quantity deviation DFc before passing through the high-pass filter A15 is used as an input value for the I controller. However, if the main-feedback control circuit is configured such that the cylinder fuel supply quantity deviation DFc is input to the I controller as is, the above-described problem of interference between air-fuel ratio controls of the engine arises again.

However, in the case where the cylinder fuel supply quantity deviation DFc assumes a relatively large value stemming from a large deviation of the air-fuel ratio of the engine from the stoichiometric air-fuel ratio, the possibility of occurrence of the above-described problem of interference between air-fuel ratio controls of the engine is low, because the output value vabyfs of the upstream air-fuel-ratio sensor 66 and the output value Voxs of the downstream air-fuel-ratio sensor 67 are highly likely to indicate air-fuel ratios having deviated in the same direction from the stoichiometric air-fuel ratio.

On the basis of the above-described knowledge, as shown in FIG. 5, the present apparatus is configured to include means A18 and A19. Hereinbelow, each of these means will be described with reference to FIG. 5.

First, dead-band setting means A18 inputs the cylinder fuel supply quantity deviation DFc, and, as shown in FIG. 5, sets the output value; i.e., a dead-band-processing passed cylinder fuel supply quantity deviation DFcdz, to "0," when the absolute value of the cylinder fuel supply quantity deviation DFc is not greater than a predetermined positive value d (when the absolute value falls within a predetermined range including "0"). Meanwhile, when the cylinder fuel supply quantity deviation DFc is greater than the value d (when falling above the predetermined range), the dead-band setting means A18 increases the value of the dead-band-processing passed cylinder fuel supply quantity deviation DFcdz from "0" as the cylinder fuel supply quantity deviation DFc increases from the value d; and when the cylinder fuel supply quantity deviation DFc is smaller than a value −d (when falling below the predetermined range), the dead-band setting means A18 decreases the value of the dead-band-processing passed cylinder fuel supply quantity deviation DFcdz from "0" as the cylinder fuel supply quantity deviation DFc decreases from the value −d.

An I controller A19 obtains integral-processed main-feedback control quantity DFidz in accordance with Equation 9 described below; i.e., by performing integral processing (I processing) for the dead-band-processing passed cylinder fuel supply quantity deviation DFcdz, which is the output value of the dead-band setting means A18. In Equation 9, Gidz is a preset integral gain (integral constant). SDFcdz is a value obtained by integrating the dead-band-processing passed cylinder fuel supply quantity deviation DFcdz with respect to time.

$$DFidz = Gidz \cdot SDFcdz \qquad \text{Eq. 9}$$

As described previously, the present apparatus obtains the regular main-feedback control quantity DFi by adding the integral-processed main-feedback control quantity DFidz to the main-feedback control quantity DFihi by use of the regular main-feedback control quantity calculation means A17. The dead-band setting means A18 and the I controller A19 correspond to the remaining portion of the main-feedback control means. That is, the fuel injection quantity calculation means A5, the table conversion means A10, the cylinder intake-air quantity delay means A11, the cylinder fuel supply quantity calculation means A12, the target cylinder fuel supply quantity delay means A13, the cylinder fuel supply quantity deviation calculation means A14, the high-pass filter A15, the PI controller A16, the regular main-feedback control quantity calculation means A17, the dead-band setting means A18, and the I controller A19 correspond to the main feedback control means.

By virtue of the above-described configuration, in the main-feedback control, only when the possibility of occurrence of the above-described problem of interference between air-fuel ratio controls of the engine is low (when the absolute value of the cylinder fuel supply quantity deviation DFc is greater than the predetermined value d), the cylinder fuel supply quantity deviation DFc is subjected to integral processing, and the integral-processed main-feedback control quantity DFidz obtained as a result of the integral processing is immediately reflected in the main-feedback control quantity DFi. Accordingly, in the case where the error of the injector 39 or the like abruptly increases, the error of the injector 39 or like is immediately compensated by the main-feedback control.

Meanwhile, in the sub-feedback control, the low-pass-filter passed output deviation DVoxslow is always subjected to integral processing, and is reliably reflected in the sub-feedback control coefficient KFi. Accordingly, when the possibility of occurrence of the above-described problem of interference between air-fuel ratio controls of the engine is high (when the absolute value of the cylinder fuel supply quantity deviation DFc is not greater than the predetermined value d), the error of the injector 39 or like is reliably compensated by the sub-feedback control only, without causing the above-described problem of interference between air-fuel ratio controls of the engine. The above is an outline of the feedback control of air-fuel ratio of the engine performed by the air-fuel-ratio control apparatus including the exhaust purification apparatus configured in the above-described manner.

Actual Operation:

Next, the actual operation of the air-fuel-ratio control apparatus will be described.

<Air-Fuel-Ratio Feedback Control>

Figure 7:
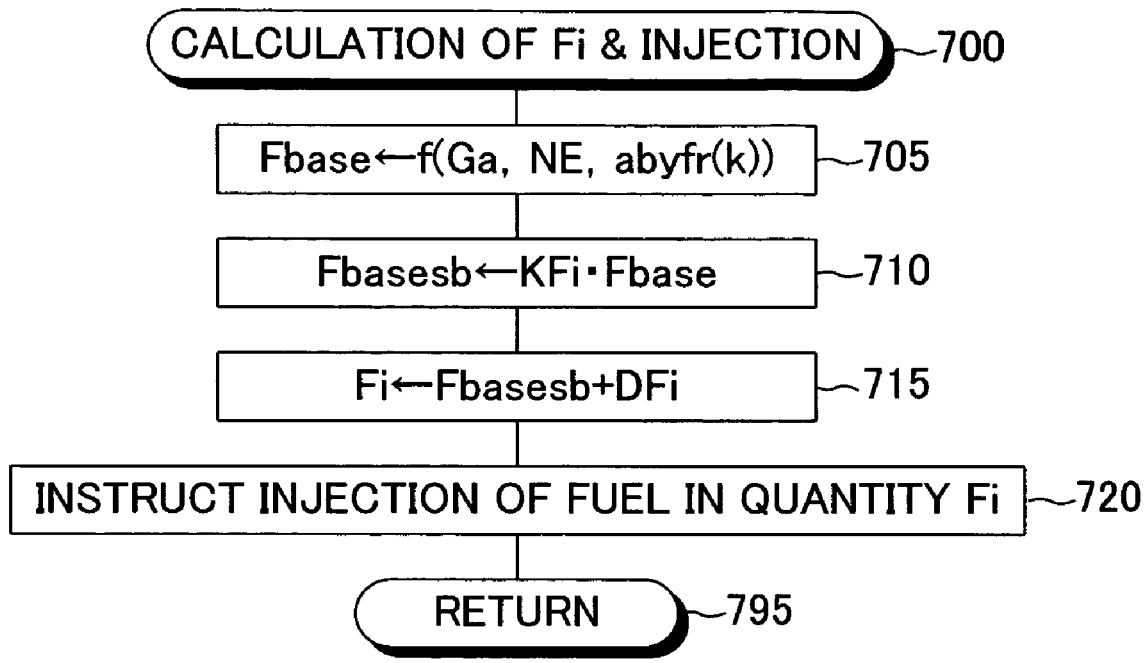
FIG. 7 is a flowchart showing a routine that the CPU shown in FIG. 1 executes so as to calculate a fuel injection quantity.

The CPU 71 repeatedly executes the routine shown by a flowchart in FIG. 7 and adapted to calculate the fuel injection quantity Fi and instruct fuel injection, every time the crank angle of each cylinder reaches a predetermined crank angle before the intake top dead center (e.g., BTDC 90° CA). Accordingly, when the crank angle of an arbitrary cylinder reaches the predetermined crank angle, the CPU 71 starts the processing from step 700, and proceeds to step 705, in which the CPU 71 obtains the base fuel injection quantity Fbase on the basis of the intake-air flow rate Ga measured by the air flowmeter 61, the engine speed NE, and the upstream-side target air-fuel ratio abyfr(k). The base fuel injection quantity Fbase represents a fuel injection quantity required to render the air-fuel ratio of the engine equal to the upstream-side target air-fuel ratio abyfr(k).

Subsequently, the CPU 71 proceeds to step 710 so as to obtain the sub-feedback control fuel injection quantity Fbasesb, which is the value obtained by multiplying the base fuel injection quantity Fbase by the sub-feedback control coefficient KFi to be described later. In subsequent step 715, the CPU 71 obtains the (final) fuel injection quantity Fi in accordance with the expression shown in the box of step 715 (corresponding to the above-described Equation 1); i.e., by adding the regular main-feedback control quantity DFi, which will be described later, to the sub-feedback control fuel injection quantity Fbasesb.

Subsequently, the CPU 71 proceeds to step 720, in which the CPU 71 instructs the injector 39 to inject fuel in an amount corresponding to the fuel injection quantity Fi. Subsequently, the CPU 71 proceeds to step 795 so as to end the present routine for the present. By virtue of the above-described operation, fuel is injected to a cylinder which starts the intake stroke, in an amount corresponding to the fuel injection quantity Fi having undergone main-feedback correction and sub-feedback correction.

Calculation of Regular Main-Feedback Control Quantity:

Next will be described operation of the CPU 71 for calculating the regular main-feedback control quantity DFi in the above-described main-feedback control. The CPU 71 repeatedly executes the routine shown by a flowchart in FIG. 8 every time a predetermined period of time elapses. When a predetermined timing is reached, the CPU 71 starts the processing from step 800, and proceeds to step 805 in order to determine whether conditions for the main-feedback control are satisfied. The conditions for the main-feedback control are satisfied, for example, when the cooling-water temperature THW of the engine is equal to or higher than a first predetermined temperature, and an intake-air quantity of the engine per revolution (load) is equal to or less than a predetermined value.

The description will be continued under the assumption that the conditions for the main-feedback control are satisfied presently. The CPU 71 makes a "Yes" determination in step 805, and then proceeds to step 810. In step 810, the CPU 71 obtains the detection air-fuel ratio abyfs at the present point in time, by converting the output value vabyfs of the upstream air-fuel-ratio sensor 66 at the present point in time on the basis of the table shown in FIG. 3.

Next, the CPU 71 proceeds to step 815 in order to obtain an actual cylinder fuel supply quantity Fc(k−N) at the time point N strokes before the present point in time, by dividing the cylinder intake air quantity Mc(k−N), which is the intake air quantity of a cylinder which started the intake stroke at the time point N strokes (N intake strokes) before the present point in time, by the above-mentioned, obtained detection air-fuel ratio abyfs.

Subsequently, the CPU 71 proceeds to step 820 in order to obtain the target cylinder fuel supply quantity Fcr(k−N) at the time point N strokes before the present point in time, by dividing the cylinder intake air quantity Mc(k−N) at the time point N strokes before the present point in time by the target air-fuel ratio abyfr(k−N) at the time point N strokes before the present point in time.

[110]
Then, the CPU 71 proceeds to step 825 in order to obtain the cylinder fuel supply quantity deviation DFc in accordance with the above-described Equation 5; i.e., by subtracting the cylinder fuel supply quantity Fc(k−N) from the target cylinder fuel supply quantity Fcr(k−N). That is, the cylinder fuel supply quantity deviation DFc is a quantity which represents the excessiveness/insufficiency of fuel having been supplied to the cylinder at the time point N strokes before the present point in time. Subsequently, the CPU 71 proceeds to step 830 in order to perform high-pass filter processing for the cylinder fuel supply quantity deviation DFc by use of the high-pass filer A15, to thereby obtain the high-pass-filter passed cylinder fuel supply quantity deviation DFchi.

Subsequently, the CPU 71 proceeds to step 835 in order to obtain the main-feedback control quantity DFihi in accordance with the expression shown in the box of step 835 (corresponding to the above-described Equation 7), and then proceeds to step 840 so as to add the high-pass-filter passed cylinder fuel supply quantity deviation DFchi obtained in the above-described step 830 to the integral value SDFchi of the high-pass-filter passed cylinder fuel supply quantity deviation DFchi at that point in time, to thereby obtain a new integral value SDFchi of the high-pass-filter passed cylinder fuel supply quantity deviation DFchi.

Next, the CPU 71 proceeds to step 845 in order to obtain the dead-band-processing passed cylinder fuel supply quantity deviation DFcdz on the basis of the above-mentioned, obtained cylinder fuel supply quantity deviation DFc and by use of the dead-band setting means A18. In subsequent step 850, the CPU 71 obtains the integral-processed main-feedback control quantity DFidz in accordance with the expression shown in the box of step 850 (corresponding to the above-described Equation 9). Subsequently, the CPU 71 proceeds to step 855 in order to add the dead-band-processing passed cylinder fuel supply quantity deviation DFcdz obtained in the above-described step 845 to the integral value SDFcdz of the dead-band-processing passed cylinder fuel supply quantity deviation DFcdz at that point in time, to thereby obtain a new integral value SDFcdz of the dead-band-processing passed cylinder fuel supply quantity deviation DFcdz.

Then, the CPU 71 proceeds to step 860 in order to obtain the regular main-feedback control quantity DFi on the basis of the main-feedback control quantity DFihi obtained in step 835 and the integral-processed main-feedback control quantity DFidz obtained in step 850, in accordance with the expression shown in the box of step 860 (corresponding to the above-described Equation 8). Subsequently, the CPU 71 proceeds to step 895 so as to end the present routine for the present.

By virtue of the above-described processing, the regular main-feedback control quantity DFi is obtained and reflected in the fuel injection quantity Fi in the above-described step 715 of FIG. 7, whereby the air-fuel ratio control of the engine is performed on the basis of the above-described main-feedback control.

Meanwhile, when the conditions for the main-feedback control are not satisfied, the CPU 71 makes a "No" determination in step 805, and proceeds to step 865 in order to set the value of the regular main-feedback control quantity DFi to "0." Subsequently, the CPU 71 proceeds to step 895 so as to end the present routine for the present. As described above, when the conditions for the main-feedback control are not satisfied, the regular main-feedback control quantity DFi is set to "0," so that correction of the air-fuel ratio of the engine on the basis of the main-feedback control is not performed.

Calculation of Sub-Feedback Control Coefficient:

Next will be described operation of the CPU 71 for calculating the sub-feedback control coefficient KFi in the above-described sub-feedback control. The CPU 71 repeatedly executes the routine shown by a flowchart in FIG. 9 every time a predetermined period of time elapses. When a predetermined timing is reached, the CPU 71 starts the processing from step 900, and proceeds to step 905 in order to determine whether conditions for the sub-feedback control are satisfied. The conditions for the sub-feedback control are satisfied, for example, when the cooling-water temperature THW of the engine becomes equal to or higher than a second predetermined temperature higher than the first predetermined temperature, and the conditions for the main-feedback control mentioned in relation to the above-described step 805 are satisfied.

The description will be continued under the assumption that the conditions for the sub-feedback control are satisfied presently. The CPU 71 makes a "Yes" determination in step 905, and then proceeds to step 910. In step 910, the CPU 71 obtains the output deviation DVoxs in accordance with the above-described Equation 2; i.e., by subtracting the output value Voxs of the downstream air-fuel-ratio sensor 67 at the present point in time from the downstream-side target value Voxsref.

Next, the CPU 71 proceeds to step 915 in order to perform low-pass filter processing for the output deviation DVoxs by use of the low-pass filter A8, to thereby obtain the low-pass-filter passed output deviation DVoxslow. In subsequent step 920, the CPU 71 obtains the derivative value DDVoxslow of the low-pass-filter passed output deviation DVoxslow in accordance with the following Equation 10.

$$DDVoxslow = (DVoxslow - DVoxslow1)/\Delta t \qquad \text{Eq. 10}$$

In Equation 10, DVoxslow1 represents the previous value of the low-pass-filter passed output deviation DVoxslow, which has been set (updated) in the later-described step 935 in the previous execution of the present routine. Further, $\Delta t$ represents the calculation period of the present routine (the above-described predetermined period of time).

Subsequently, the CPU 71 proceeds step 925 in order to obtain the sub-feedback control coefficient KFi in accordance with the above-described Equation 4, and then proceeds to step 930 so as to add the low-pass-filter passed output deviation DVoxslow obtained in step 915 to the integral value SDVoxslow of the low-pass-filter passed output deviation at that point in time, to thereby obtain a new integral value SDVoxslow of the low-pass-filter passed output deviation. In subsequent step 935, the CPU 71 stores the low-pass-filter passed output deviation DVoxslow obtained in the above-described step 915, as the previous value DVoxslow1 of the low-pass-filter passed output deviation DVoxslow. Subsequently, the CPU 71 proceeds to step 995 so as to end the present routine for the present.

By virtue of the above-described processing, the sub-feedback control coefficient KFi is obtained and reflected in the fuel injection quantity Fi in the above-described step 710 of FIG. 7, whereby the air-fuel ratio control of the engine is performed on the basis of the above-described sub-feedback control.

Meanwhile, when the conditions for the sub-feedback control are not satisfied, the CPU 71 makes a "No" determination in step 905, and proceeds to step 940 in order to set the value of the sub-feedback control coefficient KFi to "0." Subsequently, the CPU 71 proceeds to step 995 so as to end the present routine for the present. As described above, when the conditions for the sub-feedback control are not satisfied, the sub-feedback control coefficient KFi is set to "0," so that correction of the air-fuel ratio of the engine on the basis of the sub-feedback control is not performed.

As described above, according to the first embodiment of the exhaust purification apparatus for an internal combustion engine according to the present invention, the main-feedback control circuit (i.e., the main-feedback controller (PI controller A16)) and the sub-feedback control circuit (i.e., the sub-feedback controller (PID controller A9)) are connected in parallel to the internal combustion engine 10. Accordingly, even when one of a main-feedback control constant (proportional gain Gphi or integral gain Gihi) used by the PI controller A16 and a sub-feedback control constant (proportional gain Kp, integral gain Ki, or derivative gain Kd) used by the PID controller A9 is adjusted for optimization, this adjustment of the control constant is less likely to be influenced by the other control constant. As a result, the labor needed to optimize the respective feedback control constants can be reduced.

Further, the PI controller A16 and the PID controller A9, each performing integral processing (I processing), are connected in parallel to the internal combustion engine 10. Therefore, so-called double-integral processing, which has been performed in conventional apparatuses, is not performed, and thus, the stability of control can be maintained at a high level.

In the main-feedback control, a signal having passed through the high-pass filter A15 having a time constant τ is input to the PI controller A16; and in the sub-feedback control, a signal having passed through the low-pass filter A8 having the same time constant τ as that of the high-pass filter A15 is input to the PID controller A9. Therefore, the sub-feedback control can reliably perform substantial air-fuel ratio control for variations in air-fuel ratio whose frequencies are not higher than the cutoff frequency ωcut and which may appear as variations in the air-fuel ratio on the downstream side of the first catalyst unit 53, and the main-feedback control can quickly and reliably perform air-fuel ratio control for variations in air-fuel ratio whose frequencies are higher than the cutoff frequency ωcut (compensation for abrupt change in the air-fuel ratio in a transitional operating state). That is, the frequency band of variations in air-fuel ratio for which the main-feedback control is performed is separated from the frequency band of variations in air-fuel ratio for which the sub-feedback control is performed, with the cutoff frequency ωcut being used as a boundary. As a result, the air-fuel ratio control of the engine on the basis of the main-feedback control and the air-fuel ratio control of the engine on the basis of the sub-feedback control are prevented from interfering with each other.

In the main-feedback control circuit, the I controller A19 is disposed in parallel to the PI controller A16; and the signal before passing through the high-pass filter A15, which represents the cylinder fuel supply quantity deviation DFc, is input to the I controller A19 via the dead-band setting means A18. Accordingly, in the main-feedback control, only when the air-fuel ratio of the engine greatly deviates from the stoichiometric air-fuel ratio (i.e., when the possibility of occurrence of the problem of interference between air-fuel ratio controls of the engine is low), the integral processing is performed by the I controller A19, and the integral-processed main-feedback control quantity DFidz, which is an integral value obtained as a result of the integral processing, is immediately reflected in the regular main-feedback control quantity DFi. Accordingly, in the case where the error of the injector 39 or like abruptly increases, the error of the injector 39 or like is immediately compensated by the main-feedback control.

Meanwhile, in the sub-feedback control, the low-pass-filter passed output deviation DVoxslow is always subjected to integral processing, and is reliably reflected in the sub-feedback control coefficient KFi. Accordingly, when the air-fuel ratio of the engine changes in the vicinity of the stoichiometric air-fuel ratio (when the possibility of occurrence of the problem of interference between air-fuel ratio controls of the engine is high), the error of the injector 39 or like is reliably compensated by the sub-feedback control only, without causing the above-described problem of interference between air-fuel ratio controls of the engine.

Figure 10:
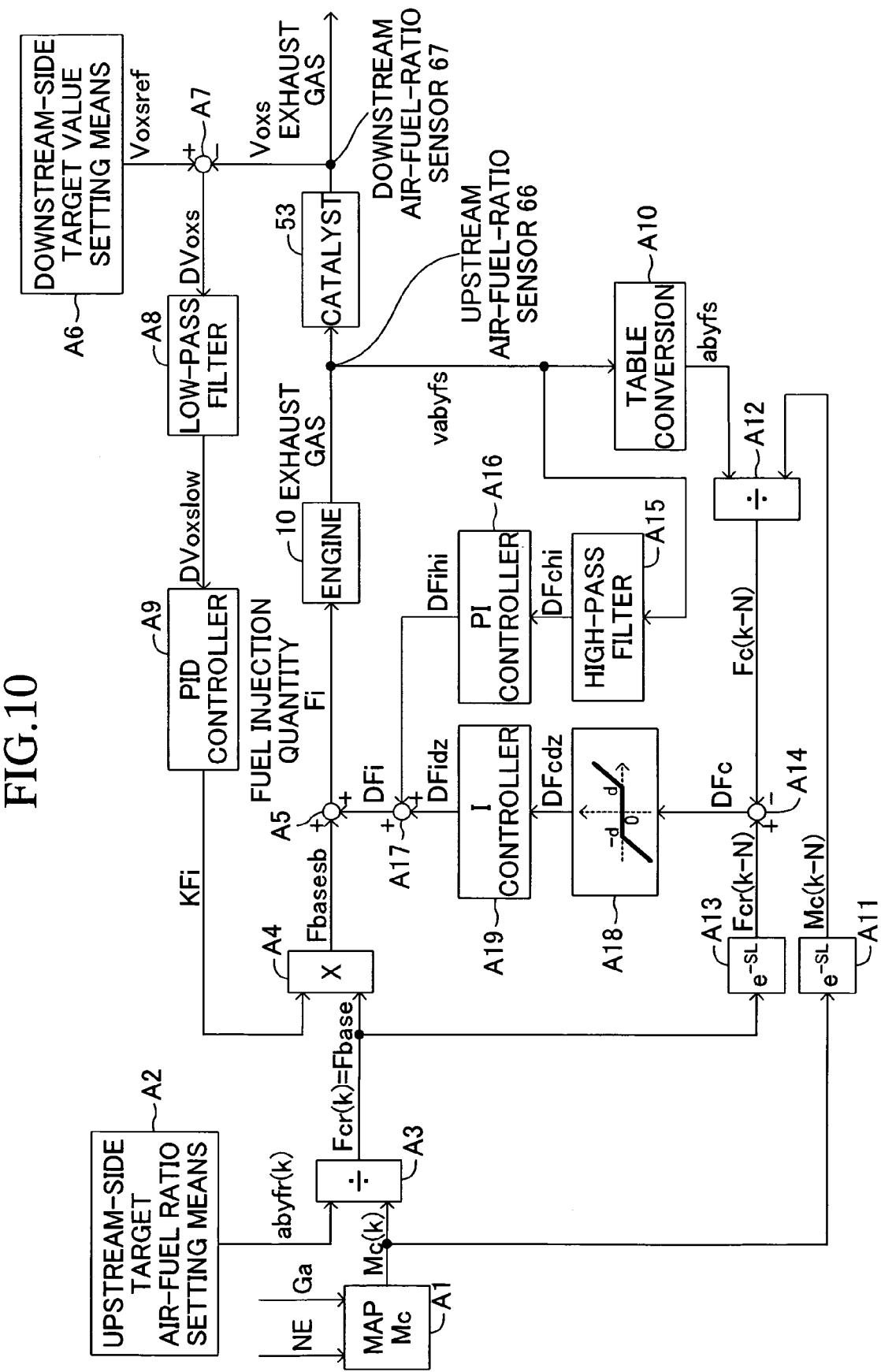
FIG. 10 is a functional block diagram showing functions of an air-fuel-ratio control apparatus (exhaust purification apparatus) according to a modification of the first embodiment, when the air-fuel-ratio control apparatus executes air-fuel-ratio feedback control.

Modification of First Embodiment:

Next, an exhaust purification apparatus according to a modification of the first embodiment will be described. As shown in FIG. 10, which is a functional block diagram of the exhaust purification apparatus, the present modification is identical with the first embodiment except that instead of the cylinder fuel supply quantity deviation DFc, the output value vabyfs of the upstream air-fuel-ratio sensor 66 is input directly to the high-pass filter A15. That is, the regular main-feedback control quantity DFi is calculated on the basis of the value obtained as a result of performing high-pass filter processing for the output value vabyfs of the upstream air-fuel-ratio sensor 66. Hereinbelow, mainly this difference will be described.

Figure 8:
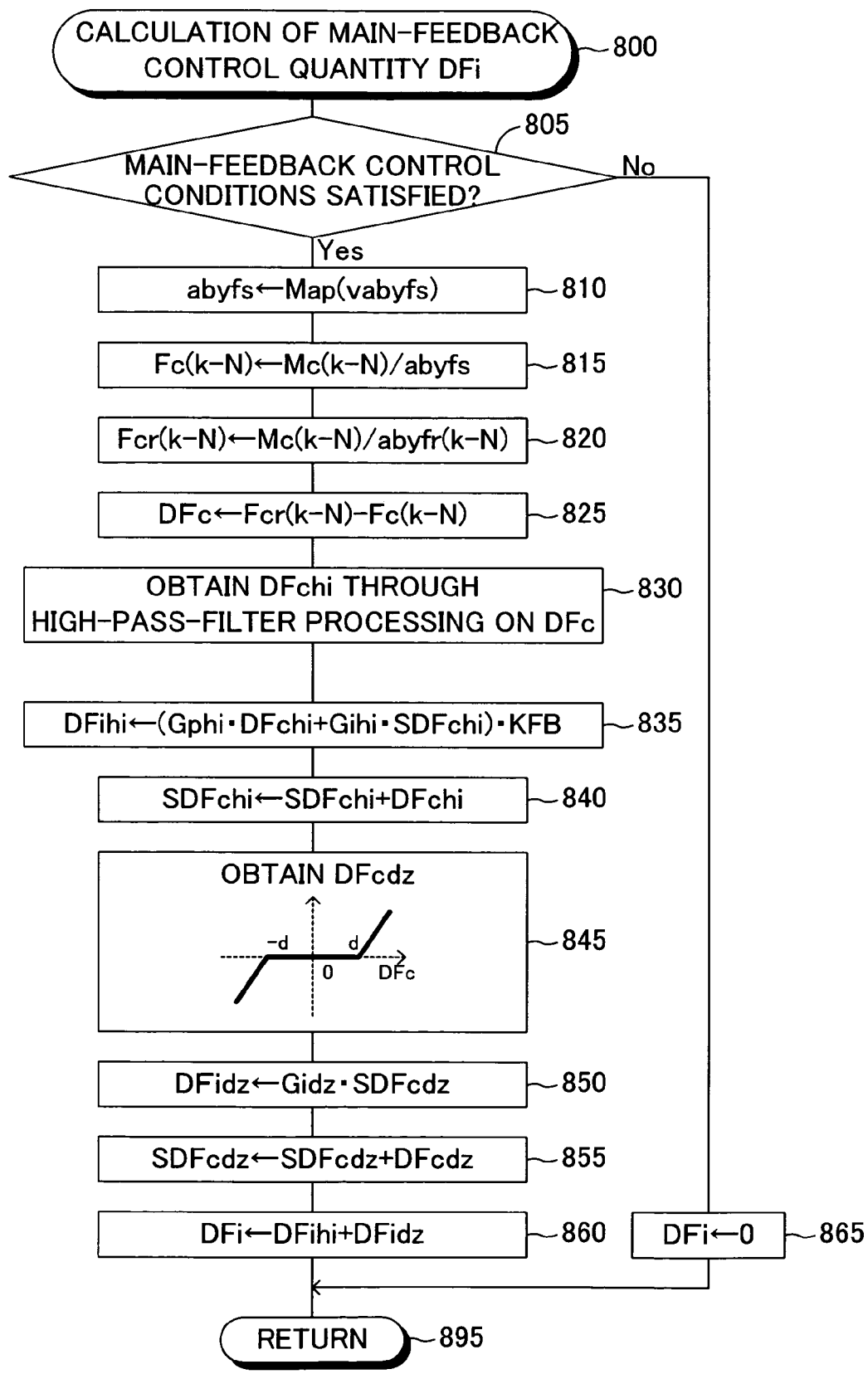
FIG. 8 is a flowchart showing a routine that the CPU shown in FIG. 1 executes so as to calculate a main-feedback control quantity.
Figure 11:
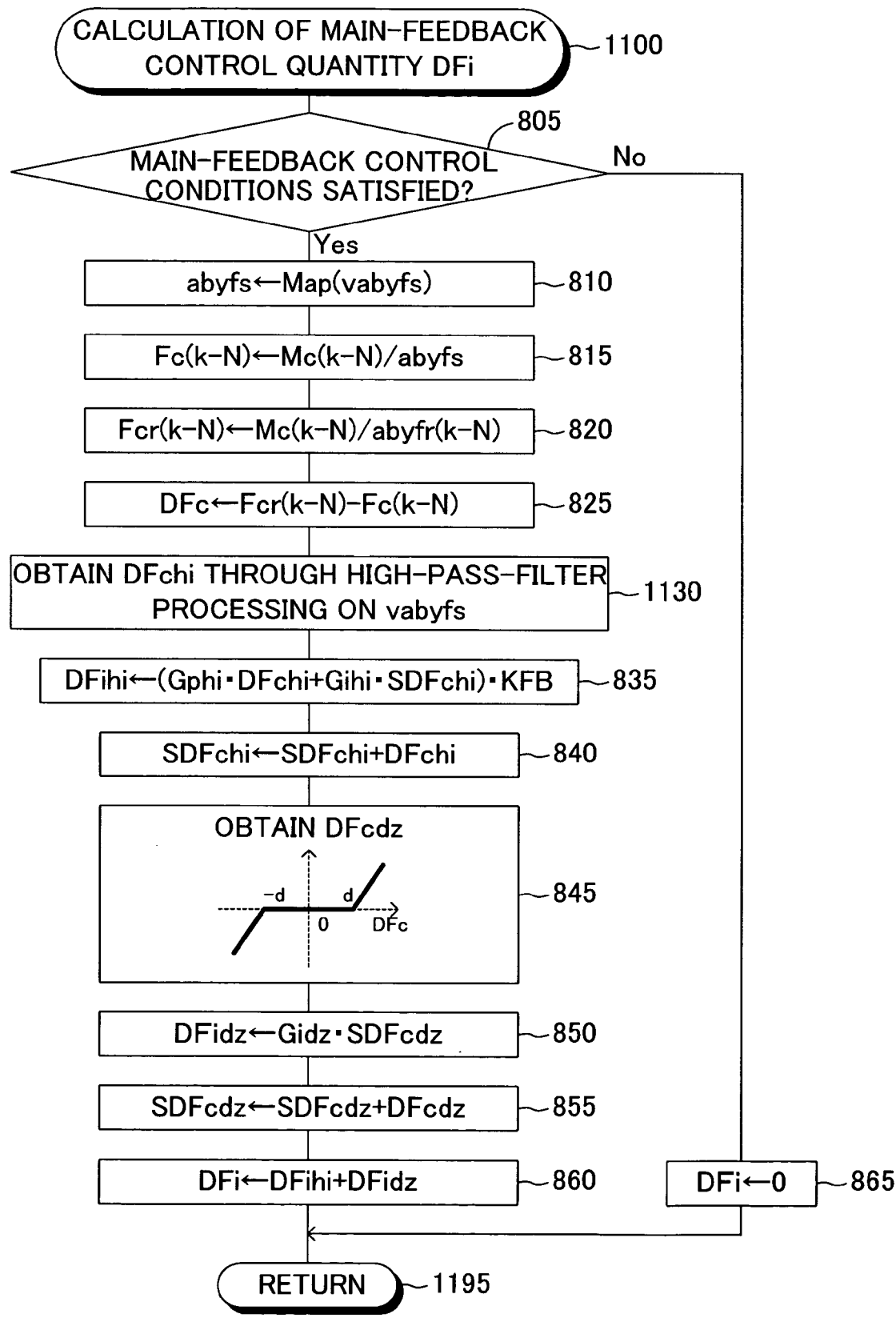
FIG. 11 is a flowchart showing a routine that the CPU of the exhaust purification apparatus according to the modification executes so as to calculate a main-feedback control quantity.

Reflecting this difference, in place of the routine shown in FIG. 8, the CPU 71 according to the present modification executes the routine shown by a flowchart in FIG. 11 and adapted to calculate the regular main-feedback control quantity DFi, every time a predetermined period of time elapses. In FIG. 11, steps identical with those shown in FIG. 8 are denoted by the same reference numerals. The routine of FIG. 11 differs from the routine of FIG. 8 only in the point that in step 1130, the high-pass-filter passed cylinder fuel supply quantity deviation DFchi is obtained from the output value vabyfs of the upstream air-fuel-ratio sensor 66, not from the cylinder fuel supply quantity deviation DFc. In actuality, because of the difference in physical quantity (dimension) of the signal input to the PI controller A16, the proportional gain Gphi and the integral gain Gihi in step 835 of FIG. 11 are set to respective values which differ from the values of the proportional gain Gphi and the integral gain Gihi in step 835 of FIG. 8. Detailed description of the remaining steps of the routine of FIG. 11 will be omitted.

In the first embodiment, the cylinder fuel supply quantity deviation DFc input to the high-pass filter A15 is a value obtained by subtracting the actual cylinder fuel supply quantity Fc(k−N) from the target cylinder fuel supply quantity Fcr(k−N), where the actual cylinder fuel supply quantity Fc(k−N) is a value obtained by converting, to a cylinder fuel quantity, the detection air-fuel ratio abyfs obtained as a result of conversion of the output value vabyfs of the upstream air-fuel-ratio sensor 66 by use of the table shown in FIG. 3, and the target cylinder fuel supply quantity Fcr(k−N) is a value obtained by converting the upstream-side target air-fuel ratio abyfr to a cylinder fuel quantity. Accordingly, the signal representing the cylinder fuel supply quantity deviation DFc has a waveform whose instantaneous magnitude increases and decreases at the same timing as the output value vabyfs of the upstream air-fuel-ratio sensor 66, although its center of variation and amplitude differ from those of the output value vabyfs.

Therefore, the signal after passing through the high-pass filter A15, which signal consists of high-frequency components whose frequencies are higher than the cutoff frequency ωcut and represents the cylinder fuel supply quantity deviation DFc, also has a waveform whose instantaneous magnitude increases and decreases at the same timing as the signal after passing through the high-pass filter A15, which signal consists of high-frequency components whose frequencies are higher than the cutoff frequency ωcut and represents the output value vabyfs of the upstream air-fuel-ratio sensor 66, although its amplitude differs from that of the second-mentioned signal. As a result, upon adjustment of the proportional gain Gphi and the integral gain Gihi in the PI controller A16 in accordance with the amplitude difference, the modification of the first embodiment provides action and effects which are completely the same as those accomplished by the first embodiment.

Figure 12:
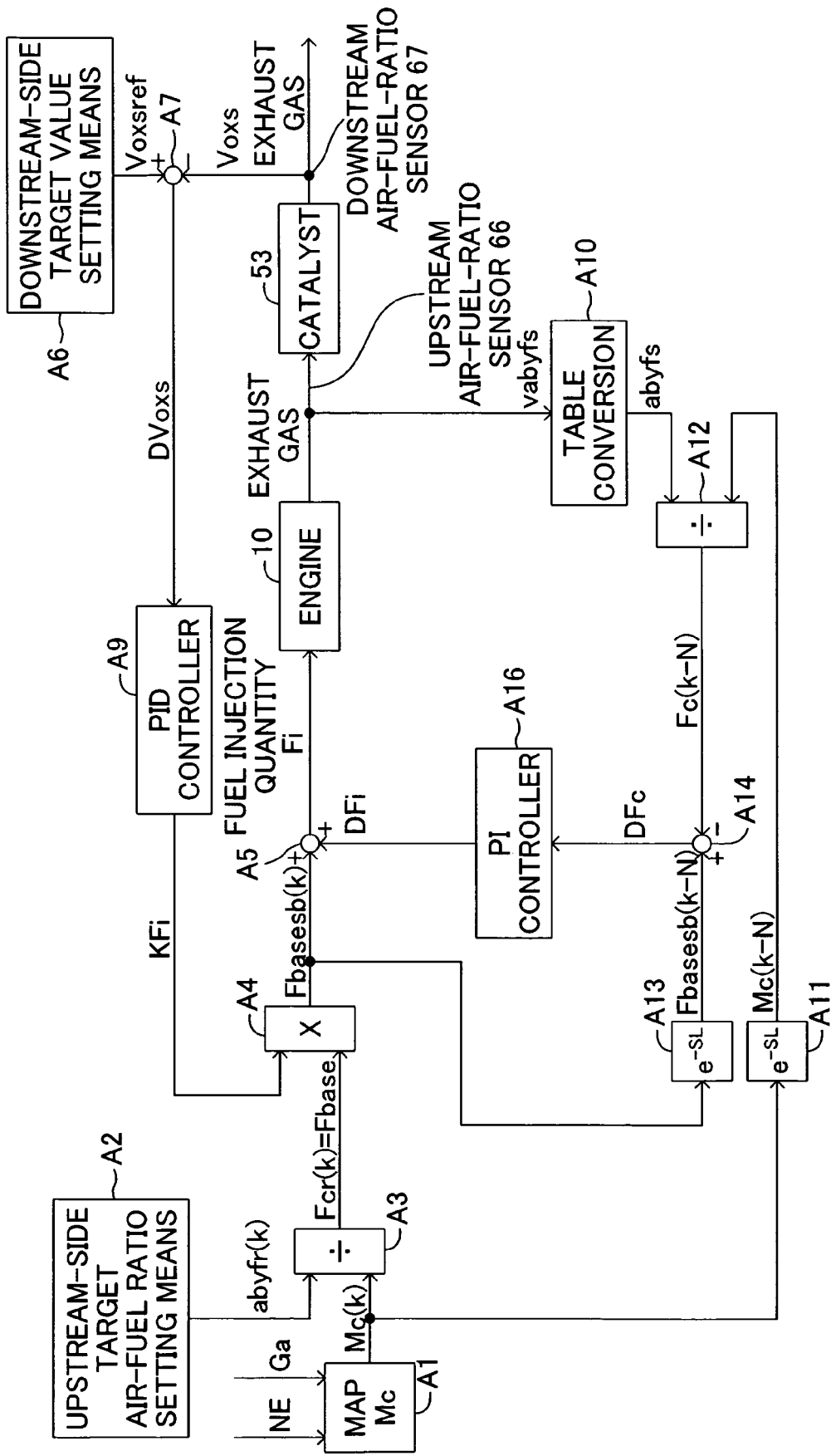
FIG. 12 is a functional block diagram showing functions of an air-fuel-ratio control apparatus (exhaust purification apparatus) according to a second embodiment of the present invention, when the air-fuel-ratio control apparatus executes air-fuel-ratio feedback control.

Second Embodiment:

Next, an exhaust purification apparatus according to a second embodiment will be described. As shown in FIG. 12, which is a functional block diagram of the exhaust purification apparatus, the second embodiment is identical with the first embodiment, except that the high-pass filter A15 and the low-pass filter A8 are not provided, the dead-band setting means A18 and the I controller A19 are not provided (i.e., the regular main-feedback control quantity calculation means A17 is not provided, and the output of the PI controller A16 is used as the regular main-feedback control quantity DFi as is), and for calculation of the cylinder fuel supply quantity deviation DFc, the sub-feedback control fuel injection quantity Fbasesb is used in place of the target cylinder fuel supply quantity Fcr. Hereinbelow, mainly this difference will be described.

Figure 9:
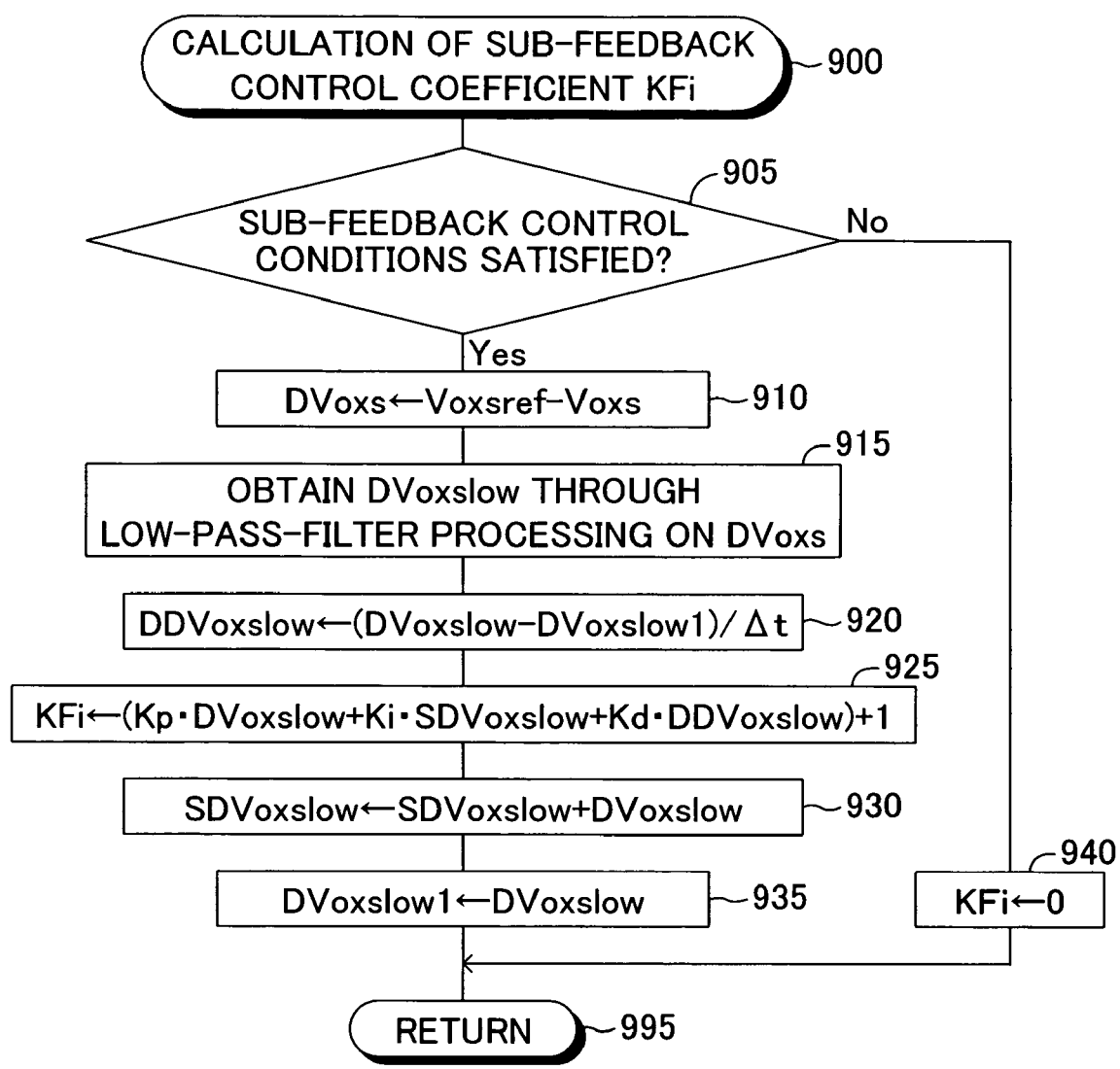
FIG. 9 is a flowchart showing a routine that the CPU shown in FIG. 1 executes so as to calculate a sub-feedback control quantity.
Figure 13:
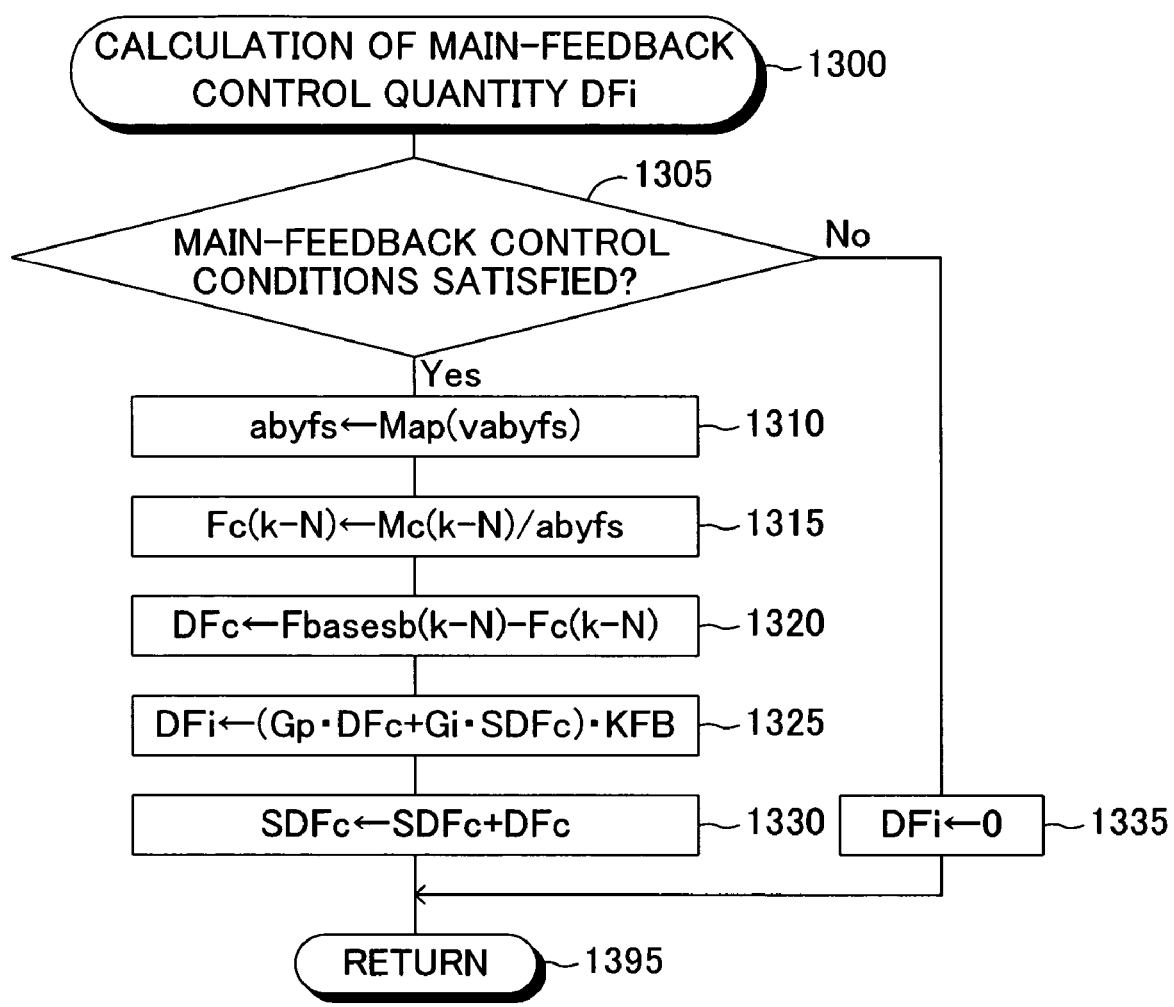
FIG. 13 is a flowchart showing a routine that the CPU of the exhaust purification apparatus according to the second embodiment executes so as to calculate a main-feedback control quantity.
Figure 14:
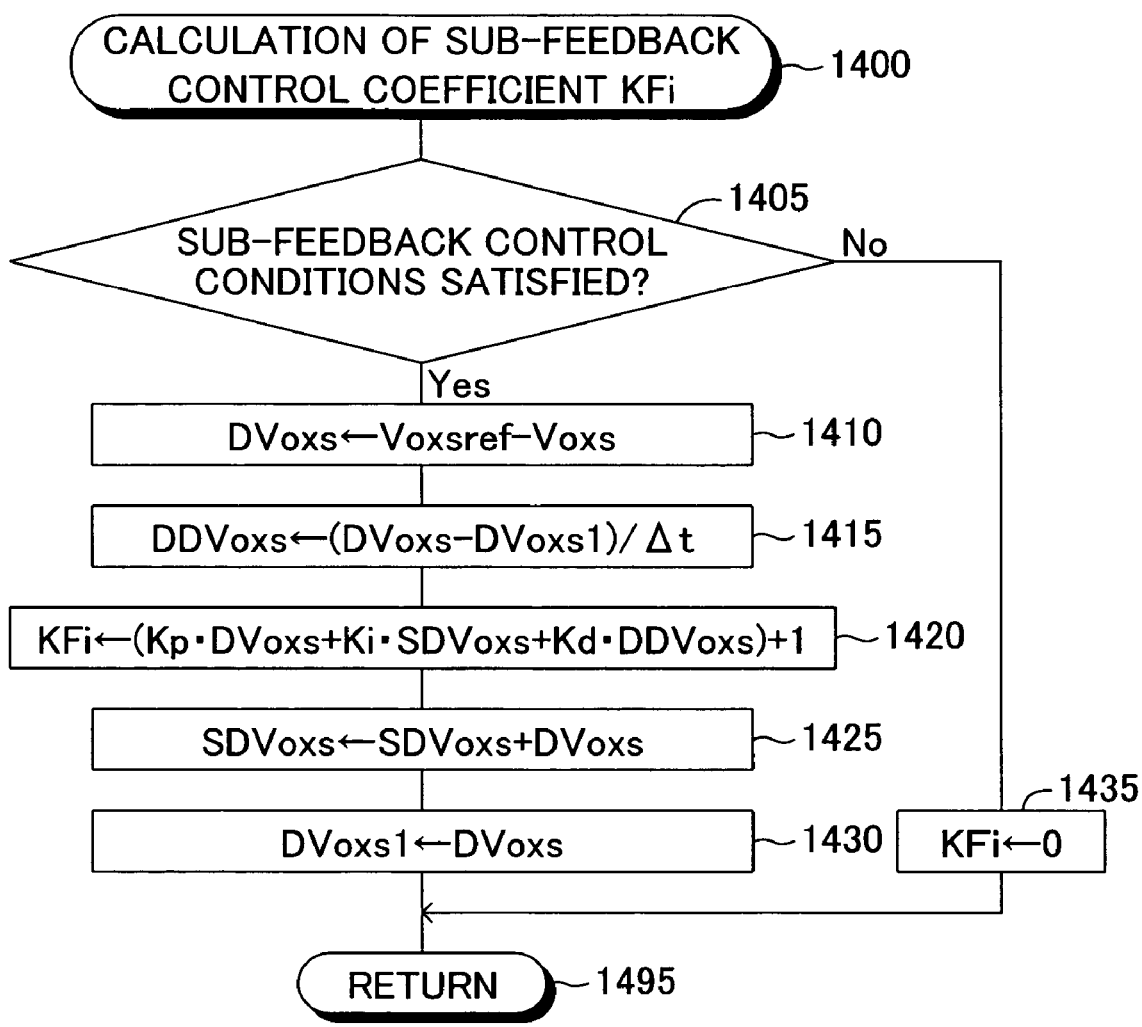
FIG. 14 is a flowchart showing a routine that the CPU of the exhaust purification apparatus according to the second embodiment executes so as to calculate a sub-feedback control quantity.

Reflecting this difference, in place of the routines shown in FIGS. 8 and 9, the CPU 71 according to the second embodiment executes, every time a predetermined period of time elapses, the routine shown by a flowchart in FIG. 13 and adapted to calculate the regular main-feedback control quantity DFi, and the routine shown by a flowchart in FIG. 14 and adapted to calculate the sub-feedback control coefficient KFi.

Accordingly, when a predetermined timing is reached, the CPU 71 of the second embodiment starts the processing from step 1300 of the routine of FIG. 13, and proceeds to step 1305 in order to determine whether conditions for the main-feedback control (which are the same as those used in step 805 of FIG. 8) are satisfied. Under the assumption that the conditions for the main-feedback control are satisfied presently, the CPU 71 obtains the detection air-fuel ratio abyfs at the present point in time in step 1310, in the same manner as in step 810. In subsequent step 1315, the CPU 71 obtains the actual cylinder fuel supply quantity Fc(k−N) at the time point N strokes before the present point in time, in the same manner as in step 815.

Subsequently, the CPU 71 proceeds to step 1320, in which the CPU 71 selects the sub-feedback control fuel injection quantity Fbasesb(k−N) at the time point N strokes before the present point in time from among the sub-feedback fuel injection quantities Fbasesb, which have been calculated in step 710 of FIG. 7 and successively stored in the RAM 73 in such a manner that the sub-feedback fuel injection quantities Fbasesb are related to the intake strokes of the respective cylinders. Next, the CPU 71 subtracts the cylinder fuel supply quantity Fc(k−N) from the sub-feedback control fuel injection quantity Fbasesb(k−N) to thereby obtain the cylinder fuel supply quantity deviation DFc.

Subsequently, the CPU 71 proceeds to step 1325 in order to obtain the main-feedback control quantity DFi in accordance with the expression shown in the box of step 1325 (similar to the above-described Equation 7), and then proceeds to step 1330 so as to add the cylinder fuel supply quantity deviation DFc obtained in the above-described step 1320 to the integral value SDFc of the cylinder fuel supply quantity deviation DFc at that point in time, to thereby obtain a new integral value SDFc of the cylinder fuel supply quantity deviation DFc. Subsequently, the CPU 71 proceeds to step 1395 so as to end the present routine for the present. Notably, in the box of step 1325, Gp represents a preset proportional gain (proportional constant), and Gi is a preset integral gain (integral constant).

By virtue of the above-described processing, the regular main-feedback control quantity DFi is obtained and reflected in the fuel injection quantity Fi in the above-described step 715 of FIG. 7, whereby the air-fuel ratio control of the engine on the basis of the above-described main-feedback control is performed.

Moreover, when a predetermined timing is reached, the CPU 71 of the second embodiment starts the processing from step 1400 of the routine of FIG. 14, and proceeds to step 1405 in order to determine whether conditions for the sub-feedback control (which are the same as those used in step 905 of FIG. 9) are satisfied. Under the assumption that the conditions for the sub-feedback control are satisfied presently, the CPU 71 proceeds to 1410 so as to obtain the output deviation DVoxs in the same manner as in step 910.

Next, the CPU 71 proceeds to step 1415, and obtains the derivative value DDVoxs of the output deviation DVoxs in accordance with the following Equation 11.

$$DDVoxs=(DVoxs-DVoxs1)/\Delta t \qquad \text{Eq. 11}$$

In Equation 11, DVoxs1 represents the previous value of the output deviation DVoxs, which has been set (updated) in the later-described step 1430 in the previous execution of the present routine. Further, Δt represents the calculation period of the present routine (the above-described predetermined period of time).

Subsequently, the CPU 71 proceeds to step 1420 in order to obtain the sub-feedback control coefficient KFi in accordance with the expression shown in the box of step 1420 (similar to the above-described Equation 4), and then proceeds to step 1425 so as to add the output deviation DVoxs obtained in step 1410 to the integral value SDVoxs of the output deviation at that point in time, to thereby obtain a new integral value SDVoxs of the output deviation. In subsequent step 1430, the CPU 71 stores the output deviation DVoxs obtained in the above-described step 1410, as the previous value DVoxs1 of the output deviation DVoxs. Subsequently, the CPU 71 proceeds to step 1495 so as to end the present routine for the present.

By virtue of the above-described processing, the sub-feedback control coefficient KFi is calculated, and reflected in the fuel injection quantity Fi in the above-described step 710 of FIG. 7, whereby the air-fuel ratio control of the engine on the basis of the above-described sub-feedback control is performed.

In the above-described second embodiment, in place of the target cylinder fuel supply quantity Fcr, which is a value obtained by dividing the cylinder intake air quantity Mc by the upstream-side target air-fuel ratio abyfr, the sub-feedback control fuel injection quantity Fbasesb, which is the value obtained by multiplying the target cylinder fuel supply quantity Fcr (=Fbase) by the sub-feedback control coefficient KFi, is used for calculation of the cylinder fuel supply quantity deviation DFc. This substantially means that the upstream-side target air-fuel ratio abyfr (accordingly, the upstream-side target value (the target value of the output of the upstream air-fuel-ratio sensor 66)) is changed in accordance with the sub-feedback control coefficient KFi. Moreover, as a result, from the viewpoint of operation the main-feedback controller (PI controller) A16 and the sub-feedback controller (PID controller) A9 are considered to be connected not only in parallel with each other, but also in series.

However, in the second embodiment, the actual cylinder fuel supply quantity Fc and the sub-feedback control fuel injection quantity Fbasesb used for calculation of the cylinder fuel supply quantity deviation DFc in the main-feedback control are both controlled to increase when the sub-feedback control coefficient KFi is higher than "1" (i.e., when control for increasing the fuel injection quantity Fi is performed). In contrast, these quantities Fc and Fbasesb are both controlled to decrease when the sub-feedback control coefficient KFi is not higher than "1" (and higher than "0") (i.e., when control for decreasing the fuel injection quantity Fi is performed). In other words, when the cylinder fuel supply quantity deviation DFc is calculated, the actual cylinder fuel supply quantity Fc is subtracted from the sub-feedback control fuel injection quantity Fbasesb to thereby cancel out the effect of the sub-feedback control coefficient KFi.

As is understood from the above, although the second embodiment is configured such that the PI controller A16 and the PID controller A9 are connected in series, so-called double-integral processing is not performed. Accordingly, the stability of control can be maintained at a high level.

Further, as described above, the effect of the sub-feedback control coefficient KFi is canceled out when the cylinder fuel supply quantity deviation DFc is calculated. Therefore, the second embodiment is not configured to directly change the main-feedback control quantity DFi in accordance with the sub-feedback control coefficient KFi. Accordingly, even when one of a main-feedback control constant (proportional gain Gp or integral gain Gi) used by the PI controller A16 and a sub-feedback control constant (proportional gain Kp, integral gain Ki, or derivative gain Kd) used by the PID controller A9 is adjusted for optimization, this adjustment of the control constant is less likely to be influenced by the other control constant. As a result, the labor needed to optimize the respective feedback control constants can be reduced.

Moreover, even in the case where the output value vabyfs of the upstream air-fuel-ratio sensor 66 and the output value Voxs of the downstream air-fuel-ratio sensor 67 indicate air-fuel ratios having deviated from the stoichiometric air-fuel ratio in opposite directions, the possibility that the direction of correction of the fuel injection quantity Fi on the basis of the sub-feedback control coefficient KFi and the direction of correction of the fuel injection quantity Fi on the basis of the main-feedback control quantity DFi become opposite becomes lower, because the upstream-side target air-fuel ratio abyfr (accordingly, the upstream-side target value (the target value of the output of the upstream air-fuel-ratio sensor 66)) is changed in accordance with the sub-feedback control coefficient KFi, as described above. In other words, the mutual interference between the air-fuel ratio control of the engine on the basis of the main-feedback control and the air-fuel ratio control of the engine on the basis of the sub-feedback control can be prevented without use of filters such as the high-pass filter A15 and the low-pass filter A8.

The present invention is not limited to the above-described embodiments, and various modifications may be employed without departing from the scope of the invention. For example, in the above-described embodiments, the cylinder fuel supply quantity deviation DFc is calculated on the basis of the deviation of the actual cylinder fuel supply quantity Fc from the target cylinder fuel supply quantity Fcr; however, the cylinder fuel supply quantity deviation DFc may be calculated from the deviation of the detection air-fuel ratio abyfs detected by the upstream air-fuel-ratio sensor 66 from the upstream-side target air-fuel ratio abyfr. Further, the embodiments may be modified in such a manner that an upstream-side target value, which is a target value of the output of the upstream air-fuel-ratio sensor 66, is set; and the cylinder fuel supply quantity deviation DFc is calculated on the basis of the deviation of the output value vabyfs of the upstream air-fuel-ratio sensor 66 from the thus-set upstream-side target value.

In the above-described embodiments, the regular main-feedback control quantity DFi, which can assume a negative or positive value, is added to the base fuel injection quantity Fbase in order to execute the main-feedback control; however, the embodiments may be modified in such a manner that a main-feedback control coefficient (>0) corresponding to the regular main-feedback control quantity DFi is set, and the base fuel injection quantity Fbase is multiplied by the main-feedback control coefficient in order to execute the main-feedback control. Similarly, in the above-described embodiments, the base fuel injection quantity Fbase is multiplied by the sub-feedback control coefficient KFi in order to execute the sub-feedback control; however, the embodiments may be modified in such a manner that a sub-feedback control quantity, which can assume a negative or positive value and which corresponds to the sub-feedback control coefficient KFi, is set, and the sub-feedback control quantity is added to the base fuel injection quantity Fbase in order to execute the sub-feedback control.

In the first embodiment and its modification, the sub-feedback control coefficient KFi is calculated on the basis of the value DVoxslow obtained as a result of performance of low-pass-filter processing for the deviation DVoxs of the output value Voxs of the downstream air-fuel-ratio sensor 67 from the downstream-side target value Voxsref. However, there may be employed a configuration in which the sub-feedback control coefficient KFi is calculated on the basis of the deviation, from the downstream-side target value Voxsref, of a value obtained as a result of performance of low-pass-filter processing for the output value Voxs of the downstream air-fuel-ratio sensor 67.

In the first embodiment and its modification, each of the high-pass filter A15 and the low-pass filter A8 is constituted by a first-order filter. However, in the case where the frequency band of variations in air-fuel ratio for which the main-feedback control is performed must be separated more strictly from the frequency band of variations in air-fuel ratio for which the sub-feedback control is performed, each of the high-pass filter A15 and the low-pass filter A8 may be constituted by a second-order filter or a filter of higher order.

In the first embodiment and its modification, at least one of the high-pass filter A15 and the low-pass filter A8 may be omitted. When the high-pass filter A15 is omitted, both the dead-band setting means A18 and the I controller A19 must be omitted, because integration of the cylinder fuel supply quantity deviation DFc is performed by the PI controller A16.

Figure 15:
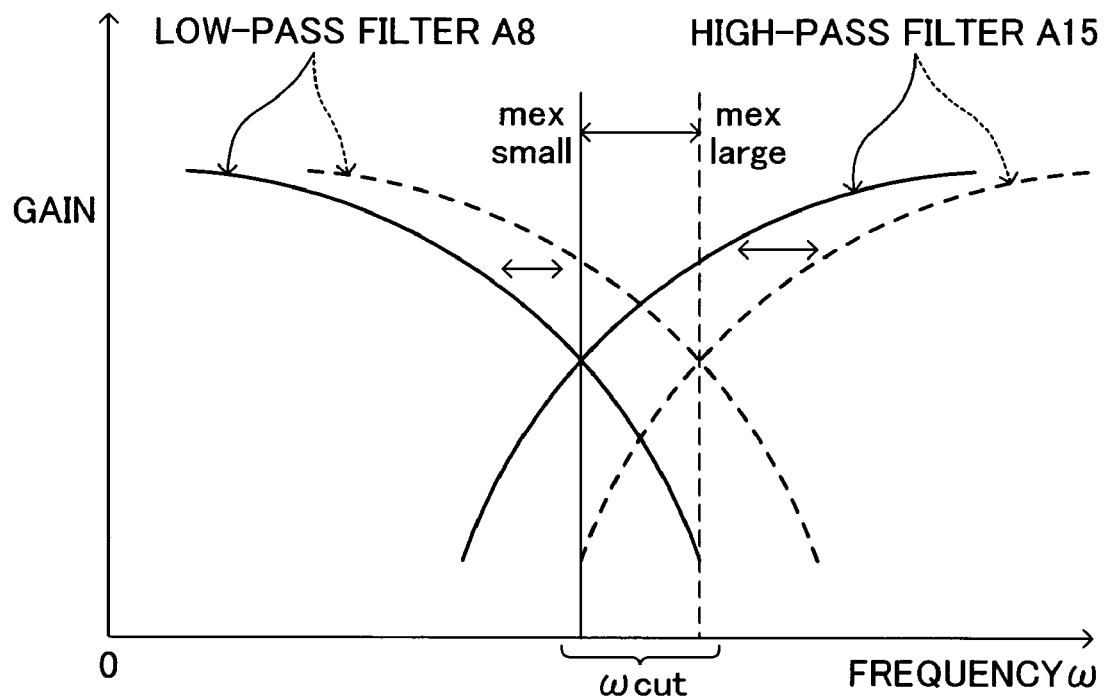
FIG. 15 is a diagram showing how the frequency-gain-characteristics of the high-pass filter and the low-pass filter shown in FIG. 6 change when their cutoff frequencies are changed in accordance with exhaust gas flow rate.

In the first embodiment and its modification, the cutoff frequency ωcut of the high-pass filter A15 and the low-pass filter A8 is a predetermined constant frequency. However, as shown in FIG. 15, the apparatus of the present invention is preferably configured to change the cutoff frequency ωcut in accordance with the flow rate mex (flow speed) of exhaust gas, because, as described previously, the frequency of air-fuel ratio variation appearing on the downstream side of the first catalyst unit 53 can increase as the flow rate mex of exhaust gas passing through the exhaust passage increases.

Figure 16:
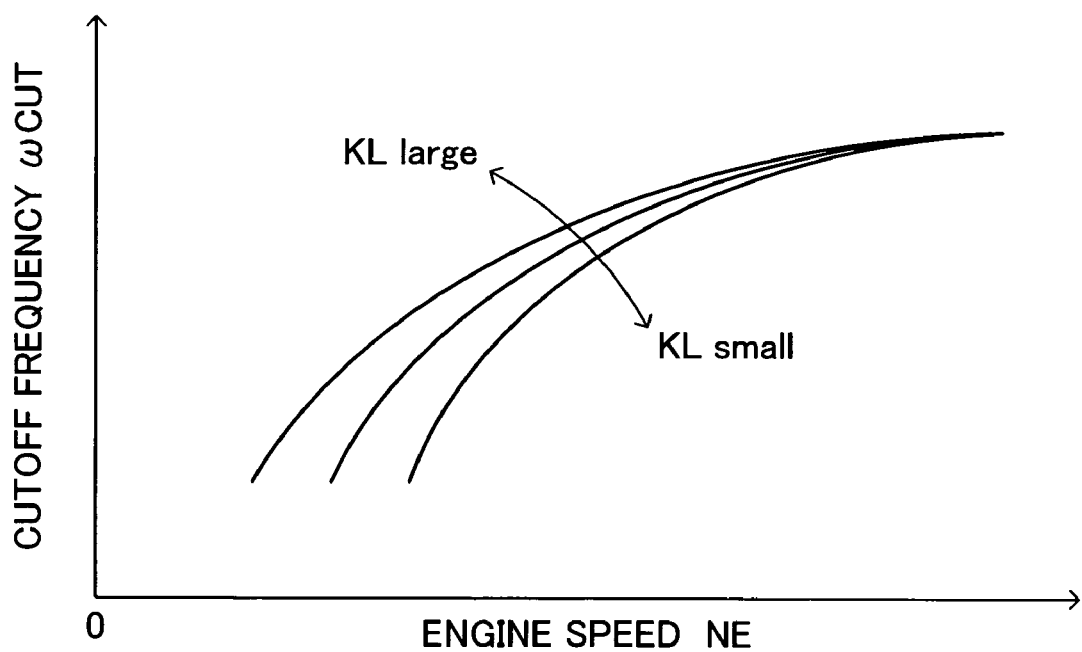
FIG. 16 is a diagram showing, in the form of a graph, a table which defines the relation between optimum cutoff frequency to be employed, engine speed, and engine load.

This exhaust gas flow rate mex has a correlation with the engine speed NE and the engine load KL (a value corresponding to the above-described cylinder intake air quantity Mc(k), which is the quantity of air taken in a cylinder per intake stroke), and increases when either the engine speed NE or the engine load KL increases. Accordingly, in this case, a table (map) shown in FIG. 16 which defines the relation between optimum cutoff frequency ωcut to be employed, the engine speed NE, and the engine load KL is obtained in advance by an experiment or the like. When high-pass filter processing is performed for the cylinder fuel supply quantity deviation DFc in step 830 of FIG. 8, when low-pass filter processing is performed for the output deviation DVoxs in step 915 of FIG. 9, or when high-pass filter processing is performed for the output value vabyfs of the upstream air-fuel-ratio sensor in step 1130 of FIG. 11, the above-described optimal cutoff frequency ωcut is obtained on the basis of the engine speed NE at the present point in time and the latest engine load KL at the present point in time, and with reference to the above-described table. Subsequently, the cutoff frequencies ωcut of the high-pass filer A15 and the low-pass filter A8 are changed to the thus-obtained optimal cutoff frequency ωcut. In this case, the cutoff frequency ωcut of the high-pass filer A15 and the cutoff frequency ωcut of the low-pass filter A8 are set to the same frequency. However, their cutoff frequencies may be set to different frequencies.

The first embodiment and its modification is preferably configured to change the cutoff frequency ωcut of the high-pass filer A15 and the low-pass filter A8 in accordance with the degree of deterioration of the first catalyst unit 53, because, as described previously, the frequency of air-fuel ratio variation appearing on the downstream side of the first catalyst unit 53 can increase as the degree of deterioration of the first catalyst unit 53 increases (e.g., the maximum oxygen storage quantity of the first catalyst unit 53 decreases).

Figure 17:
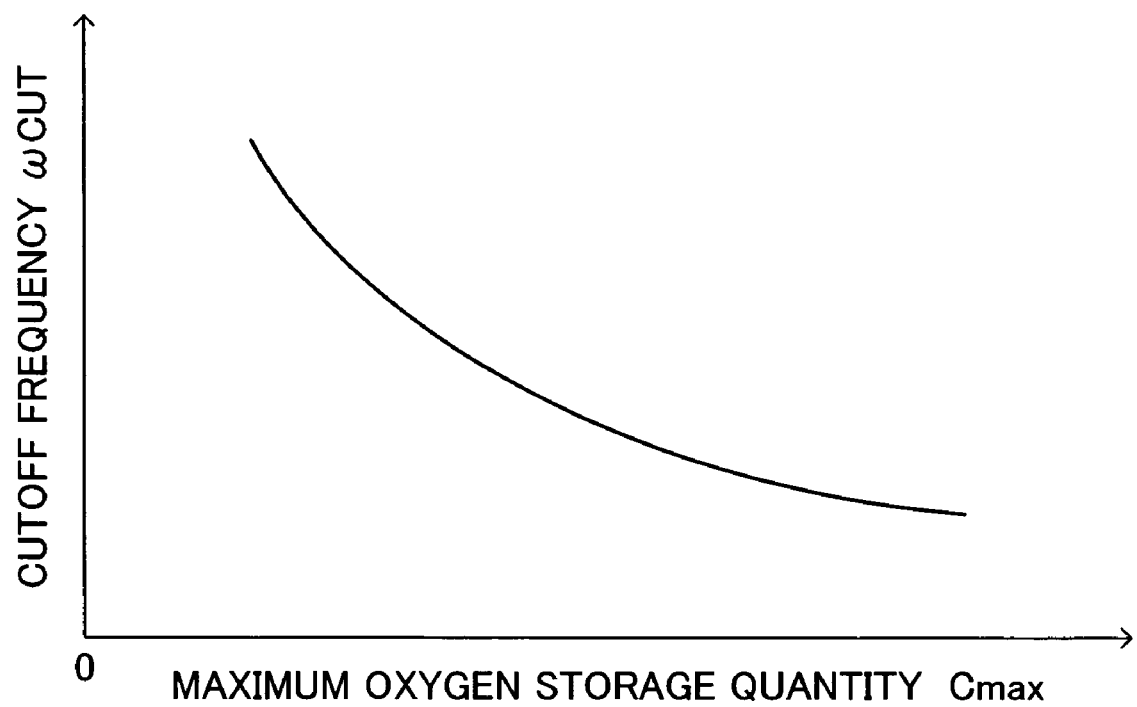
FIG. 17 is a diagram showing, in the form of a graph, a table which defines the relation between optimum cutoff frequency to be employed and the maximum oxygen storage quantity of the first catalyst unit.

The degree of deterioration of the first catalyst unit 53 can be represented by, for example, the maximum oxygen storage quantity Cmax of the first catalyst unit 53. Accordingly, in this case, a table (map) shown in FIG. 17 which defines the relation between optimum cutoff frequency ωcut to be employed and the maximum oxygen storage quantity Cmax of the first catalyst unit 53 is obtained in advance by an experiment or the like. Upon arrival at each of predetermined timings, the maximum oxygen storage quantity Cmax of the first catalyst unit 53 is obtained by a predetermined known method. When high-pass filter processing is performed for the cylinder fuel supply quantity deviation DFc in step 830 of FIG. 8, when low-pass filter processing is performed for the output deviation DVoxs in step 915 of FIG. 9, or when high-pass filter processing is performed for the output value vabyfs of the upstream air-fuel-ratio sensor in step 1130 of FIG. 11, the above-described optimal cutoff frequency ωcut is obtained on the basis of the latest maximum oxygen storage quantity Cmax of the first catalyst unit 53 at the present point in time and with reference to the above-described table. Subsequently, the cutoff frequencies ωcut of the high-pass filer A15 and the low-pass filter A8 are changed to the thus-obtained optimal cutoff frequency ωcut. In this case, the cutoff frequency ωcut of the high-pass filer A15 and the cutoff frequency ωcut of the low-pass filter A8 are set to the same frequency. However, their cutoff frequencies may be set to different frequencies.

What is claimed is:

1. An exhaust purification apparatus for an internal combustion engine equipped with fuel injection means for injecting fuel in a quantity changed in accordance with operating condition of the engine, comprising:

a catalyst unit disposed in an exhaust passage of the engine;

an upstream air-fuel-ratio sensor disposed in the exhaust passage to be located upstream of the catalyst unit;

a downstream air-fuel-ratio sensor disposed in the exhaust passage to be located downstream of the catalyst unit;

main-feedback control means for calculating a main-feedback control quantity on the basis of an output value of the upstream air-fuel-ratio sensor and a predetermined upstream-side target value, and correcting, on the basis of the main-feedback control quantity, the quantity of fuel injected by the fuel injection means, to thereby feedback-control the air-fuel ratio of the engine; and sub-feedback control means for calculating a sub-feedback control quantity on the basis of an output value of the downstream air-fuel-ratio sensor and a predetermined downstream-side target value, and correcting, on the basis of the sub-feedback control quantity, the quantity of fuel injected by the fuel injection means, independently of the correction of the fuel injection quantity by the main-feedback control means, to thereby feedback-control the air-fuel ratio of the engine.

2. An exhaust purification apparatus for an internal combustion engine according to claim 1, wherein the main-feedback control means is configured to calculate the main-feedback control quantity on the basis of a value obtained through performance of high-pass filter processing on a value determined on the basis of the deviation of the output value of the upstream air-fuel-ratio sensor from the predetermined upstream-side target value.

3. An exhaust purification apparatus for an internal combustion engine equipped with fuel injection means for injecting fuel in a quantity changed in accordance with operating condition of the engine, comprising:

a catalyst unit disposed in an exhaust passage of the engine;

an upstream air-fuel-ratio sensor disposed in the exhaust passage to be located upstream of the catalyst unit;

a downstream air-fuel-ratio sensor disposed in the exhaust passage to be located downstream of the catalyst unit;

main-feedback control means for calculating a main-feedback control quantity on the basis of a value obtained through performance of high-pass-filter processing on an output value of the upstream air-fuel-ratio sensor, and correcting, on the basis of the main-feedback control quantity, the quantity of fuel injected by the fuel injection means, to thereby feedback-control the air-fuel ratio of the engine; and sub-feedback control means for calculating a sub-feedback control quantity on the basis of an output value of the downstream air-fuel-ratio sensor and a predetermined downstream-side target value, and correcting, on the basis of the sub-feedback control quantity, the quantity of fuel injected by the fuel injection means, independently of the correction of the fuel injection quantity by the main-feedback control means, to thereby feedback-control the air-fuel ratio of the engine.

4. An exhaust purification apparatus for an internal combustion engine according to claim 2, wherein the sub-feedback control means is configured to calculate the sub-feedback control quantity on the basis of a value obtained through performance of low-pass filter processing on a value determined on the basis of the deviation of the output value of the downstream air-fuel-ratio sensor from the predetermined downstream-side target value, or on the basis of a value determined on the basis of the deviation, from the predetermined downstream-side target value, of a value obtained through performance of low-pass filter processing on the output value of the downstream air-fuel-ratio sensor.

5. An exhaust purification apparatus for an internal combustion engine according to claim 3, wherein the sub-feedback control means is configured to calculate the sub-feedback control quantity on the basis of a value obtained through performance of low-pass filter processing on a value determined on the basis of the deviation of the output value of the downstream air-fuel-ratio sensor from the predetermined downstream-side target value, or on the basis of a value determined on the basis of the deviation, from the predetermined downstream-side target value, of a value obtained through performance of low-pass filter processing on the output value of the downstream air-fuel-ratio sensor.

6. An exhaust purification apparatus for an internal combustion engine according to claim 2, further comprising factor acquisition means for acquiring a value of a factor which affects the flow rate of exhaust gas flowing through the exhaust passage, wherein
the main-feedback control means is configured to change the cutoff frequency of the high-pass filter processing in accordance with the acquired value of the factor.

7. An exhaust purification apparatus for an internal combustion engine according to claim 3, further comprising factor acquisition means for acquiring a value of a factor which affects the flow rate of exhaust gas flowing through the exhaust passage, wherein
the main-feedback control means is configured to change the cutoff frequency of the high-pass filter processing in accordance with the acquired value of the factor.

8. An exhaust purification apparatus for an internal combustion engine according to claim 2, further comprising deterioration-index-value acquisition means for acquiring a deterioration index value which represents the degree of deterioration of the catalyst unit,
wherein the main-feedback control means is configured to change the cutoff frequency of the high-pass filter processing in accordance with the acquired deterioration index value.

9. An exhaust purification apparatus for an internal combustion engine according to claim 3, further comprising deterioration-index-value acquisition means for acquiring a deterioration index value which represents the degree of deterioration of the catalyst unit,
wherein the main-feedback control means is configured to change the cutoff frequency of the high-pass filter processing in accordance with the acquired deterioration index value.

10. An exhaust purification apparatus for an internal combustion engine according to claim 4, further comprising factor acquisition means for acquiring a value of a factor which affects the flow rate of exhaust gas flowing through the exhaust passage,
wherein the main-feedback control means and the sub-feedback control means are configured to change the cutoff frequency of the high-pass filter processing and the cutoff frequency of the low-pass filter processing, respectively, in accordance with the acquired value of the factor.

11. An exhaust purification apparatus for an internal combustion engine according to claim 5, further comprising factor acquisition means for acquiring a value of a factor which affects the flow rate of exhaust gas flowing through the exhaust passage,
wherein the main-feedback control means and the sub-feedback control means are configured to change the cutoff frequency of the high-pass filter processing and the cutoff frequency of the low-pass filter processing, respectively, in accordance with the acquired value of the factor.

12. An exhaust purification apparatus for an internal combustion engine according to claim 4, further comprising deterioration-index-value acquisition means for acquiring a deterioration index value which represents the degree of deterioration of the catalyst unit,
wherein the main-feedback control means and the sub-feedback control means are configured to change the cutoff frequency of the high-pass filter processing and the cutoff frequency of the low-pass filter processing, respectively, in accordance with the acquired deterioration index value.

13. An exhaust purification apparatus for an internal combustion engine according to claim 5, further comprising deterioration-index-value acquisition means for acquiring a deterioration index value which represents the degree of deterioration of the catalyst unit,
wherein the main-feedback control means and the sub-feedback control means are configured to change the cutoff frequency of the high-pass filter processing and the cutoff frequency of the low-pass filter processing, respectively, in accordance with the acquired deterioration index value.

14. An exhaust purification apparatus for an internal combustion engine according to claim 2, wherein
the sub-feedback control means is configured to calculate the sub-feedback control quantity on the basis of at least a time-integration value of a value determined on the basis of the deviation of the output value of the downstream air-fuel-ratio sensor from the predetermined downstream-side target value; and
the main-feedback control means includes dead-band setting means for setting its output value to zero when an input value falls within a predetermined range including zero, and for setting the output value to a value corresponding to the input value when the input value falls outside the predetermined range, wherein the main-feedback control means calculates an integral-processed main-feedback control quantity on the basis of a time-integration value of the output value of the dead-band setting means at the time when a value determined on the basis of the deviation of the output value of the upstream air-fuel-ratio sensor from the predetermined upstream-side target value is applied as the input value of the dead-band setting means, and the main-feedback control means corrects the quantity of fuel injected by the fuel injection means, on the basis of a regular main-feedback control quantity obtained by adding the integral-processed main-feedback control quantity to the main-feedback control quantity, to thereby feedback-control the air-fuel ratio of the engine.

15. An exhaust purification apparatus for an internal combustion engine according to claim 3, wherein the sub-feedback control means is configured to calculate the sub-feedback control quantity on the basis of at least a time-integration value of a value determined on the basis of the deviation of the output value of the downstream air-fuel-ratio sensor from the predetermined downstream-side target value; and the main-feedback control means includes dead-band setting means for setting its output value to zero when an input value falls within a predetermined range including zero, and for setting the output value to a value corresponding to the input value when the input value falls outside the predetermined range, wherein the main-feedback control means calculates an integral-processed main-feedback control quantity on the basis of a time-integration value of the output value of the dead-band setting means at the time when a value determined on the basis of the deviation of the output value of the upstream air-fuel-ratio sensor from the predetermined upstream-side target value is applied as the input value of the dead-band setting means, and the main-feedback control means corrects the quantity of fuel injected by the fuel injection means, on the basis of a regular main-feedback control quantity obtained by adding the integral-processed main-feedback control quantity to the main-feedback control quantity, to thereby feedback-control the air-fuel ratio of the engine.

16. An exhaust purification apparatus for an internal combustion engine according to claim 1, wherein the main-feedback control means is configured to change the predetermined upstream-side target value in accordance with the sub-feedback control quantity calculated by the sub-feedback control means.

* * * * *